US 012079951B2

(12) United States Patent
Agarwal et al.

(10) Patent No.: US 12,079,951 B2
(45) Date of Patent: Sep. 3, 2024

(54) FUZZY LOGIC-BASED PATTERN MATCHING AND CORNER FILTERING FOR DISPLAY SCALER

(71) Applicant: QUALCOMM Incorporated, San Diego, CA (US)

(72) Inventors: Rohan Agarwal, Noida (IN); Daniel Stan, Thornhill (CA); Agam Jain, Ashoknagar (IN); Panikumar Gururaj Kallamballe, Bengaluru (IN); Abhishek De, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/648,414

(22) Filed: Jan. 19, 2022

(65) Prior Publication Data

US 2023/0230201 A1    Jul. 20, 2023

(51) Int. Cl.
*G06T 3/403* (2024.01)
*G06T 7/33* (2017.01)

(52) U.S. Cl.
CPC .............. *G06T 3/403* (2013.01); *G06T 7/33* (2017.01)

(58) Field of Classification Search
CPC . G06T 3/403; G06T 7/33; G06T 2207/20021; G06T 2207/20024; G06T 3/4007
See application file for complete search history.

(56) References Cited

PUBLICATIONS

Chen P.Y., et al., "VLSI Implementation of an Edge-Oriented Image Scaling Processor", IEEE Transactions on Very Large Scale Integration (VLSI) Systems, IEEE Service Center, Piscataway, NJ, USA, vol. 17, No. 9, Sep. 1, 2009, pp. 1275-1284, XP011267770, ISSN: 1063-8210, DOI: 10.1109/TVLSI.2008.2003003 Section III, The Proposed Low-Complexity Algorithm.
International Search Report and Written Opinion—PCT/US2022/052443—ISA/EPO—May 9, 2023.
Jiang W., et al., "An Improved Edge-Adaptive Image Scaling Algorithm", ASIC, 2009, AS ICON '09, IEEE 8th International Conference On, IEEE, Piscataway, NJ, USA, Oct. 20, 2009, pp. 895-897, XP031579148, ISBN: 978-1-4244-3868-6, Section III, Proposed Algorithm.
Lai Y.T., et al., "Adaptive Image Scaling Based on Local Edge Directions", Intelligent and Advanced Systems (ICIAS), 2010 International Conference On, IEEE, Jun. 15, 2010, 4 Pages, XP031979462, DOI: 10.1109/ICIAS.2010.5716188 ISBN: 978-1-4244-6623-8 section III, Proposed Algorithm.

*Primary Examiner* — Charles T Shedrick
(74) *Attorney, Agent, or Firm* — QUALCOMM Incorporated

(57) ABSTRACT

Aspects presented herein relate to methods and devices for display processing including an apparatus, e.g., a DPU. The apparatus may receive at least one input image for a scaling operation, the at least one input image being associated with one or more scanning windows, each of the scanning windows including a plurality of pixels. The apparatus may also detect one or more features in the plurality of pixels in each of the one or more scanning windows. Further, the apparatus may adjust an amount of the plurality of pixels in each of the scanning windows for each of the detected features. The apparatus may also combine the adjusted amount of the plurality of pixels for each of the detected one or more features into a plurality of output pixels. The apparatus may also process each of the plurality of output pixels into at least one output image.

30 Claims, 22 Drawing Sheets

FUZZY LOGIC-BASED PATTERN MATCHING AND CORNER FILTERING FOR DISPLAY SCALER

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processing unit (DPU) or any apparatus that may perform display processing. The apparatus may receive at least one input image for a scaling operation, the at least one input image being associated with one or more scanning windows, each of the one or more scanning windows including a plurality of pixels. The apparatus may also detect one or more features in the plurality of pixels in each of the one or more scanning windows. Additionally, the apparatus may calculate a confidence factor for each of the detected one or more features in the plurality of pixels in each of the one or more scanning windows. The apparatus may also adjust an amount of the plurality of pixels in each of the one or more scanning windows for each of the detected one or more features. The apparatus may also combine the adjusted amount of the plurality of pixels for each of the detected one or more features into a plurality of output pixels. Moreover, the apparatus may process each of the plurality of output pixels into at least one output image. The apparatus may also transmit, to a display or a panel, the at least one output image after processing each of the plurality of output pixels.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
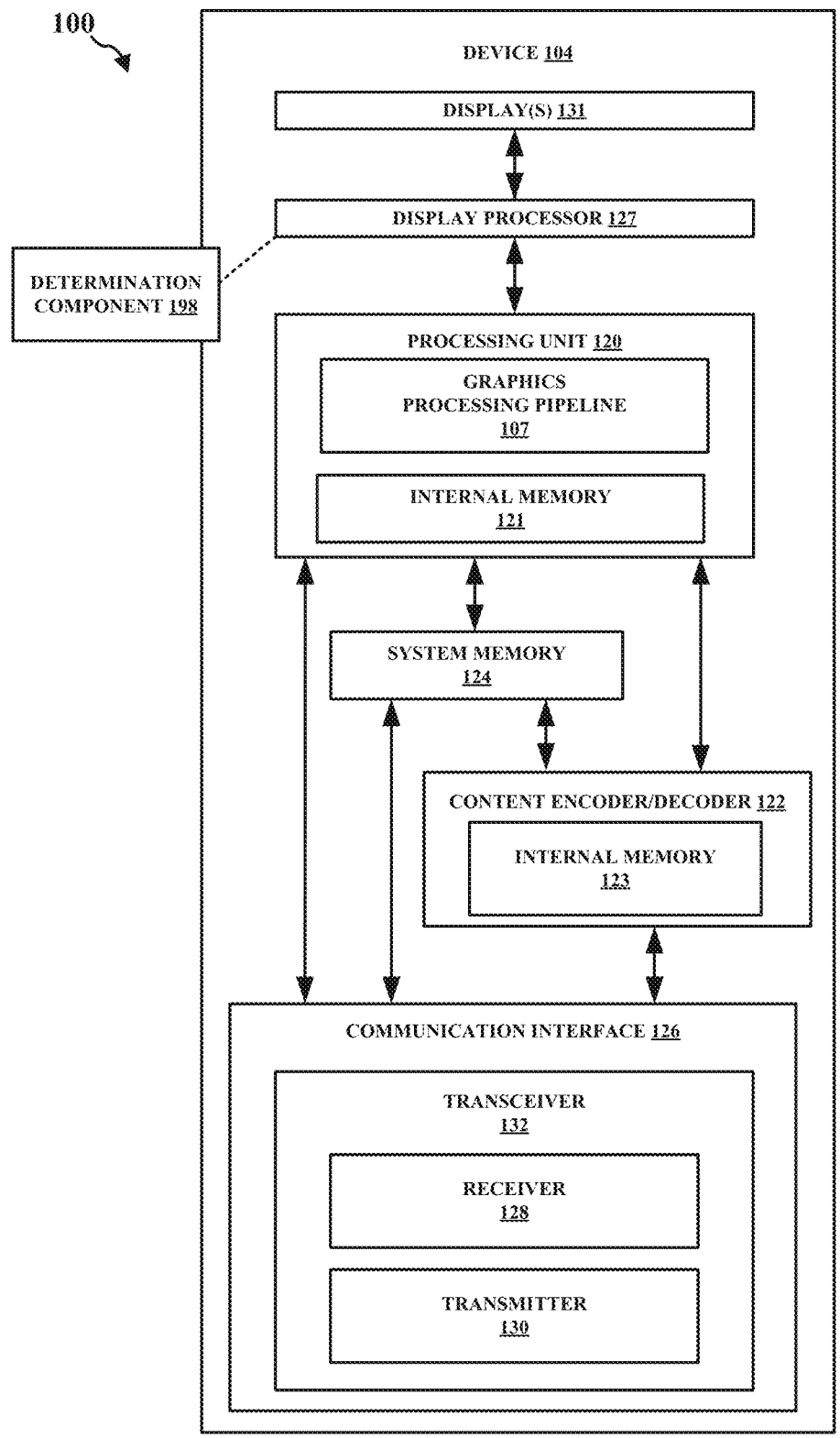
FIG. 1 is a block diagram that illustrates an example content generation system.

Aspects of display processing may utilize different types of scaling components, such as scalers or DPU scalers, for different scaling operations (e.g., upscaling or downscaling).

Some DPU scalers use a combination of bicubic filtering (i.e., edge-agnostic filtering) and gradient-based edge filtering to preserve high-frequency content during image upscaling. This technique may extract luma gradients to estimate the edge direction and strength. By design, edge filtering may be strongest along the diagonals (i.e., 45° and −45°) and weakest along the horizontal direction (i.e., 0°) and vertical direction (i.e., 90°). In some instances, the edge-filtering or directional output may be estimated by blending outputs along two fixed directions using a weight metric. For example, the following formula may be utilized: output=output*weight+output*(1−weight). Additionally, DPU scalers may utilize directional filtering, such as when an output is filtered in a detected direction. This filtered output in the detected direction may be a linear blend of outputs along a certain angle of directions (e.g., between 26° and 63° directions). Some scaling or filtering operations for display processing may include a number of drawbacks. For instance, the scaling or filtering operations may not preserve corners of an image well because luma gradients may be non-zero in two directions at the corners. Also, the scaling or filtering operations may not preserve horizontal and vertical edges well as edge filtering may drop to 0 along these directions. Moreover, the scaling or filtering operations may not fully exploit strong edge detection along the diagonal directions. Aspects of the present disclosure may utilize novel image scaling techniques for image reconstruction/enhancement processes in display applications. For instance, aspects of the present disclosure may utilize logic-based pattern matching and corner filtering techniques for scaling or filtering operations. Also, aspects of the present disclosure may utilize scaling or filtering operations that preserve corners of an image, as well as preserve horizontal and vertical edges of an image. Additionally, aspects of the present disclosure may utilize scaling or filtering operations that allow for strong edge detection along diagonal directions of an image.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a determination component 198 configured to receive at least one input image for a scaling operation, the at least one input image being associated with one or more scanning windows, each of the one or more scanning windows including a plurality of pixels. The determination component 198 may also be configured to detect one or more features in the plurality of pixels in each of the one or more scanning windows. The determination component 198 may also be configured to calculate a confidence factor for each of the detected one or more features in the plurality of pixels in each of the one or more scanning windows. The determination component 198 may also be configured to adjust an amount of the plurality of pixels in each of the one or more scanning windows for each of the detected one or more features. The determination component 198 may also be configured to combine the adjusted amount of the plurality of pixels for each of the detected one or more features into a plurality of output pixels. The determination component 198 may also be configured to process each of the plurality of output pixels into at least one output image. The determination component 198 may also be configured to transmit, to a display or a panel, the at least one output image after processing each of the plurality of output pixels. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
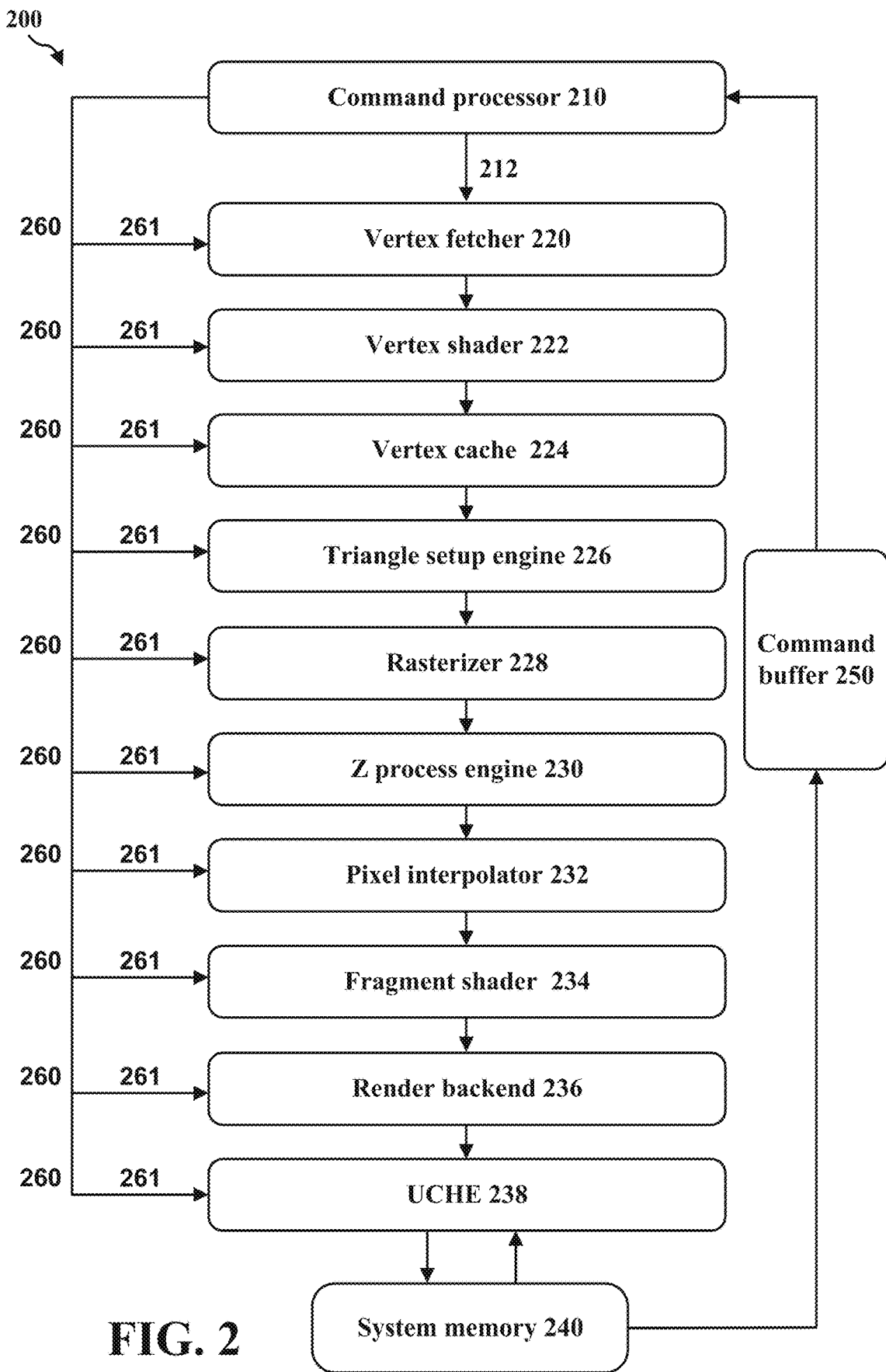
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
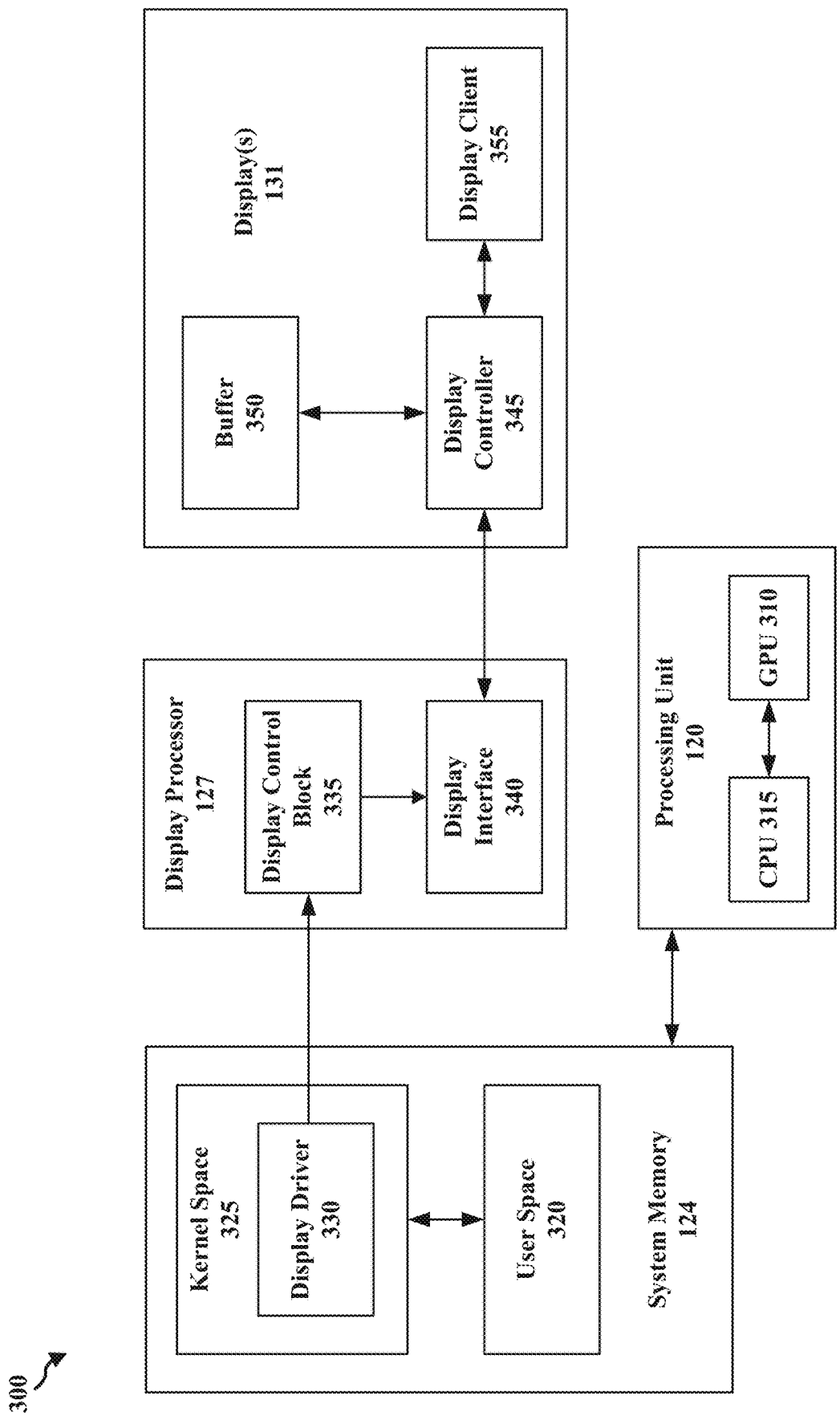
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the exemplary device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

Aspects of display processing may utilize different types of scaling components, such as scalers or DPU scalers, for different scaling operations (e.g., upscaling or downscaling). Some DPU scalers use a combination of bicubic filtering (i.e., edge-agnostic filtering) and gradient-based edge filtering to preserve high-frequency content during image upscaling. This technique may extract luma gradients to estimate the edge direction and strength. By design, edge filtering may be strongest along the diagonals (i.e., 45° and −45°) and weakest along the horizontal direction (i.e., 0°) and vertical direction (i.e., 90°). In some instances, the edge-filtering or directional output may be estimated by blending outputs along two fixed directions using a weight metric. For example, the following formula may be utilized: output=output1*weight+output2*(1−weight). Additionally, DPU scalers may utilize directional filtering, such as when an output is filtered in a detected direction. This filtered output in the detected direction may be a linear blend of outputs along a certain angle of directions (e.g., between 26° and 63° directions).

Figure 4:
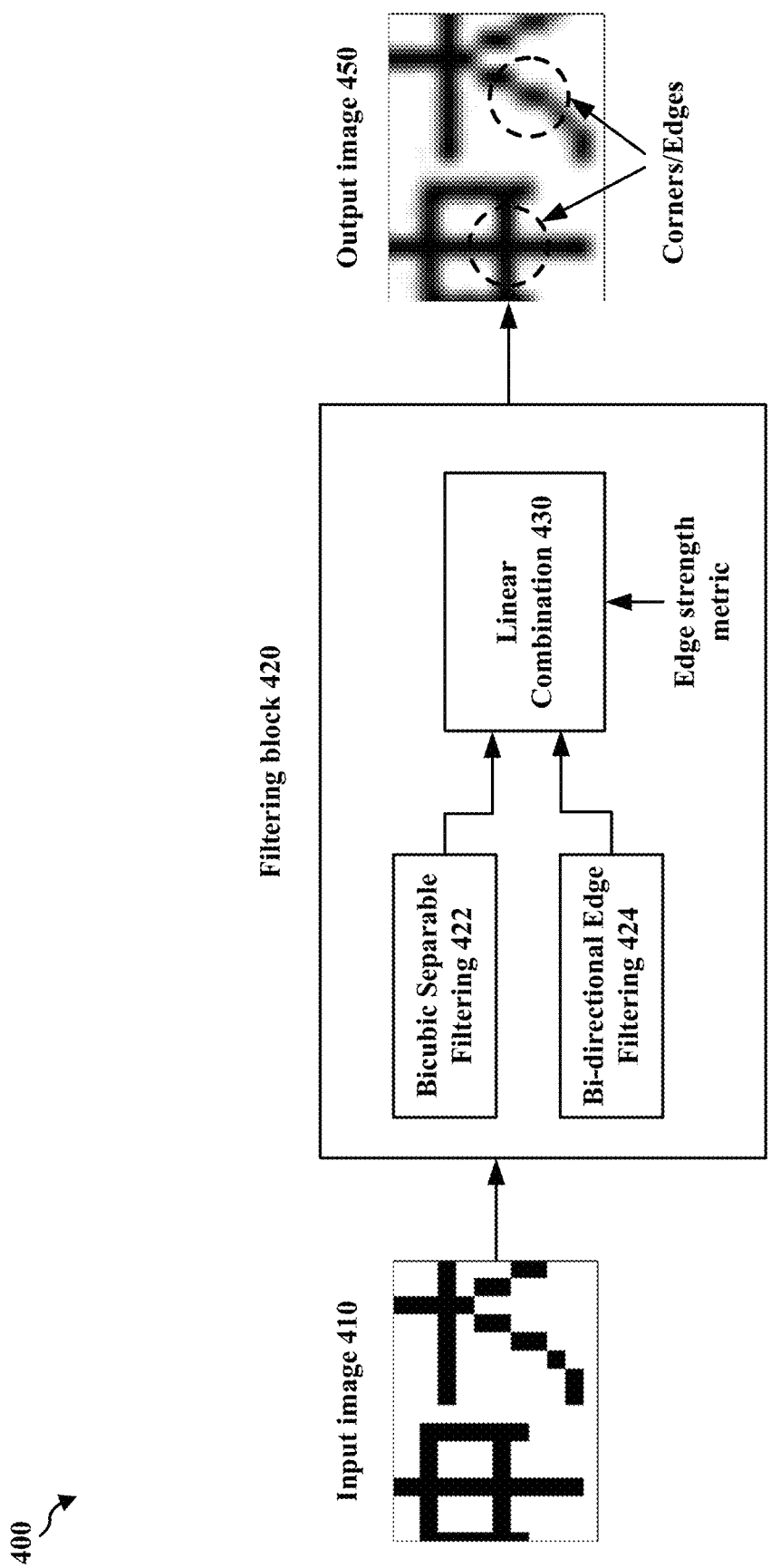
FIG. 4 is a diagram illustrating an example scaling technique for display processing.

FIG. 4 illustrates diagram 400 including one example of a scaling technique for display processing. More specifically, diagram 400 includes a linear combination of bicubic filtering and bi-directional filtering. As shown in FIG. 4, diagram 400 includes input image 410, output image 450, and filtering block 420 including bicubic separable filtering component 422, bi-directional edge filtering component 424, linear combination component 430. FIG. 4 depicts how input image 410 is filtered using linear combination component 430 with bicubic separable filtering component 422 and bi-directional edge filtering component 424 in order to obtain output image 450. As depicted in FIG. 4, linear combination component 430 includes an edge strength metric. Also, output image 450 shows the corners and edges of the image.

Some scaling or filtering operations for display processing may include a number of drawbacks. For instance, the scaling or filtering operations may not preserve corners of an image well because luma gradients may be non-zero in two directions at the corners. Also, the scaling or filtering operations may not preserve horizontal and vertical edges well as edge filtering may drop to 0 along these directions while the bicubic separable filter is preserving the horizontal and vertical edges. Moreover, the scaling or filtering operations may not fully exploit strong edge detection along the diagonal directions, as there may be no direct filtering estimation along these directions. Based on the above, it may be beneficial for scaling or filtering operations to preserve corners of an image. It may also be beneficial for scaling or filtering operations to preserve horizontal and vertical edges of an image. Further, it may be beneficial to utilize strong edge detection along diagonal directions of an image.

Aspects of the present disclosure may utilize novel image scaling techniques for image reconstruction/enhancement processes in display applications (e.g., high-resolution display applications). For instance, aspects of the present disclosure may utilize fuzzy logic-based pattern matching and corner filtering techniques for scaling or filtering operations. Also, aspects of the present disclosure may utilize scaling or filtering operations that allow for the preservation of corners of an image. Aspects presented herein may also utilize scaling or filtering operations that preserve horizontal and vertical edges of an image. Additionally, aspects of the present disclosure may utilize scaling or filtering operations that allow for strong edge detection along diagonal directions of an image.

In some instances, aspects presented herein may preserve corners and edges of an image while upscaling the image, which may lead to a higher image fidelity as this contributes to the structure of the visual scene. Aspects of the present disclosure may provide an ensemble of feature detection techniques that work in concert to preserve corners and edges of the image during the image upscaling. For example, these feature detection techniques may include hardware-realizable fixed-point algorithms to construct a high-resolution image using a single low-resolution input image. These feature detection techniques may outperform other edge detection-based DPU scalers, which may result in better preservation of image quality during upscaling, especially for graphics content and text content.

Aspects presented herein may include optimizations for DPU scalers that may be important when an input image is rich in graphics content and text content. For instance, aspects presented herein may utilize feature detection techniques that include fuzzy logic-based pattern matching techniques. Aspects presented herein may also include second order luma gradient-based corner detection. Further, aspects presented herein may include tri-directional edge filtering. Aspects presented herein may also include a non-maxima suppression algorithm. In some instances, aspects of the present disclosure may be based on a number of hypotheses, such as: (1) the human visual system may be highly adapted to extract structural and geometric information from images, (2) edge-agnostic algorithms like bicubic filtering may cause maximum blurring of edges along 45° and −45°, (3) a well-defined and sharp corner of an image may generally be divided into two regions of opposite luma polarity, (4) a second-order luma gradient may assume a high non-zero value at corners of an image.

Figure 5:
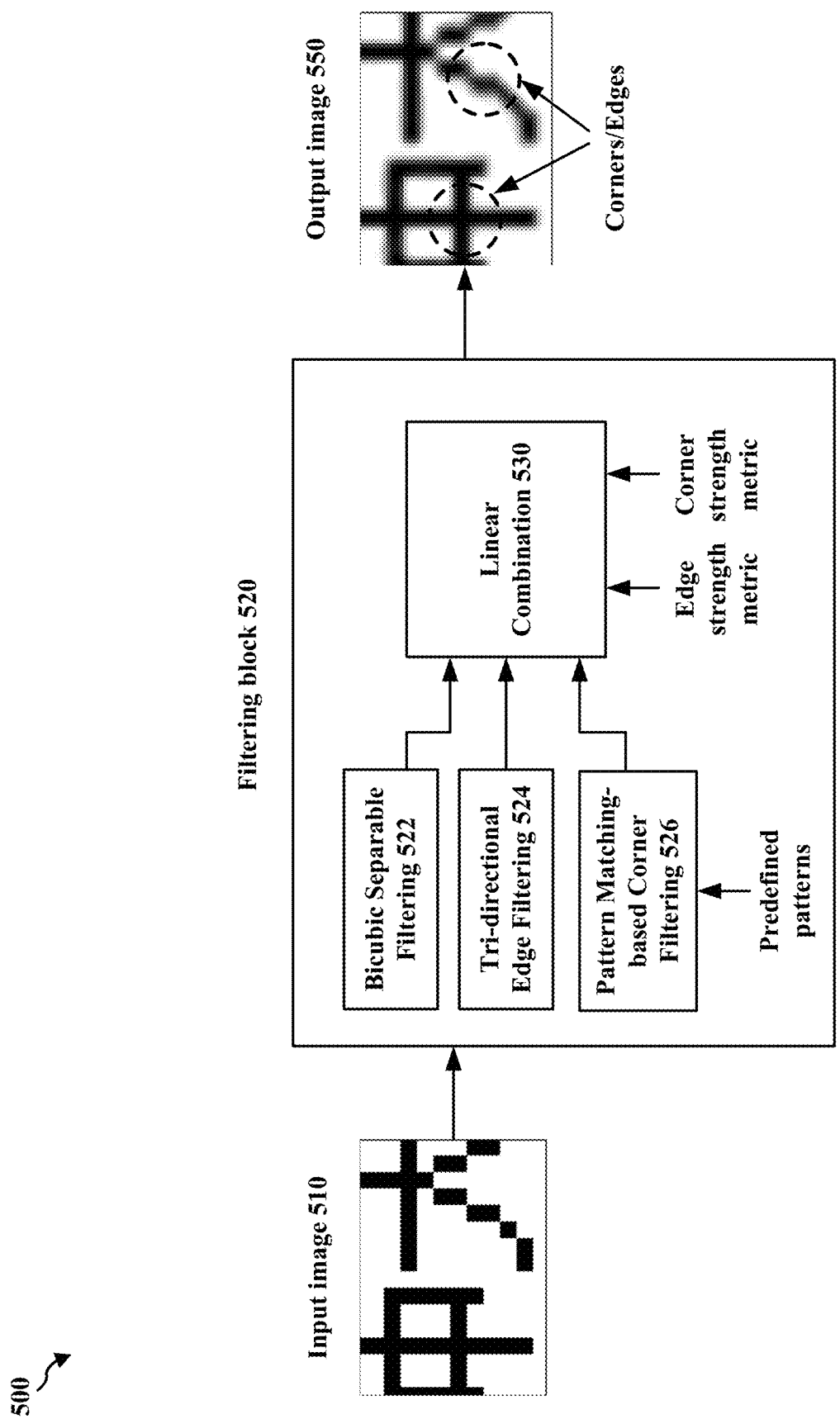
FIG. 5 is a diagram illustrating an example scaling technique for display processing.

FIG. 5 illustrates diagram 500 including one example of a scaling technique for display processing. More specifically, diagram 500 includes a linear combination of bicubic filtering, corner filtering, and tri-directional filtering. As shown in FIG. 5, diagram 500 includes input image 510, an output image 550, and a filtering block 520 including bicubic separable filtering component 522, tri-directional edge filtering component 524, pattern matching-based corner filtering component 526, and linear combination component 530. FIG. 5 depicts how input image 510 is filtered using linear combination component 530 with bicubic separable filtering component 522, tri-directional edge filtering component 524, and pattern matching-based corner filtering component 526 in order to obtain output image 550. As depicted in FIG. 5, linear combination component 530 may include an edge strength metric and a corner strength metric. Also, pattern matching-based corner filtering component 526 may include predefined patterns. Output image 550 shows the corners and edges of the image, which may be sharper and clearer compared to other scaling techniques. As shown in FIG. 5, diagram 500 includes a fuzzy logic-based pattern matching technique, as well as a second order luma gradient-based corner filtering technique.

Figure 6:
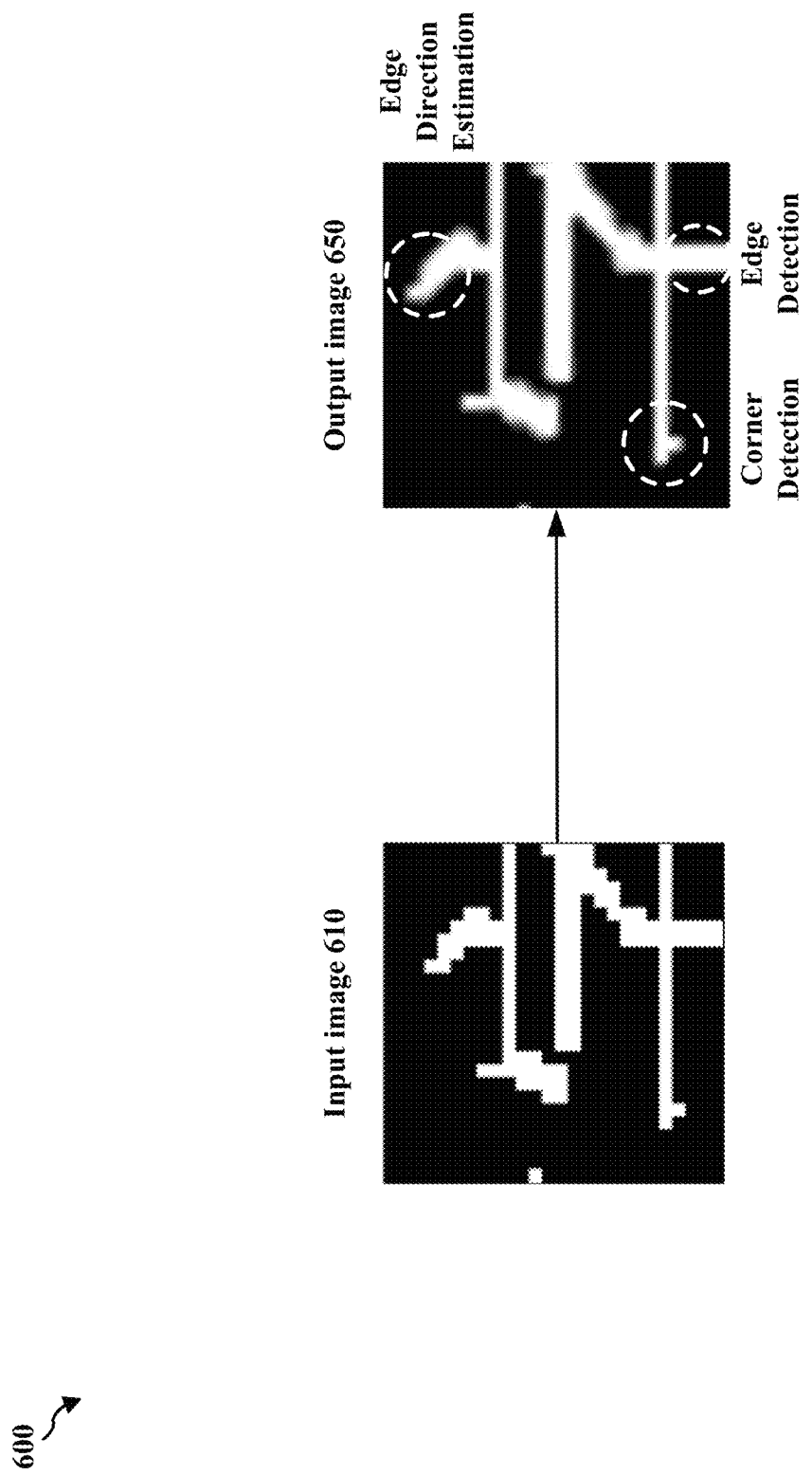
FIG. 6 is a diagram illustrating an example scaling technique for display processing.

FIG. 6 illustrates diagram 600 including one example of a scaling technique for display processing. As shown in FIG. 6, diagram 600 includes input image 610 and output image 650. FIG. 6 depicts how scaling techniques according to aspects of the present disclosure may include corner detection, edge detection, and/or edge direction estimation. For instance, aspects presented herein may include improved corner detection compared to other scaling techniques. Also, aspects presented herein may include improved edge direction estimation compared to other scaling techniques. Aspects presented herein may also include sharper and less blurry edges of the image, as well as better contrast compared to other scaling techniques.

Figure 7:
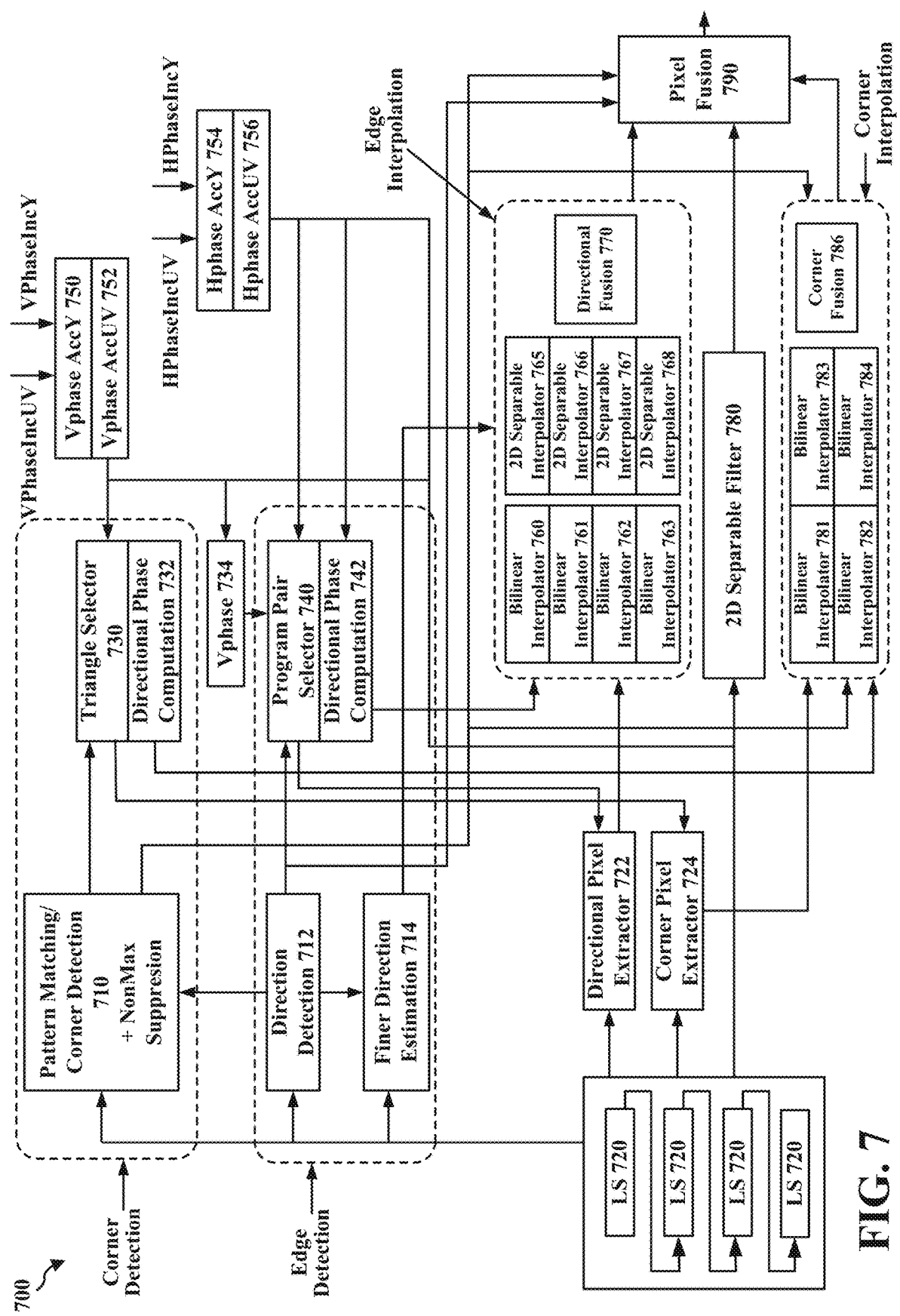
FIG. 7 is a diagram illustrating an example scaling architecture for display processing.

FIG. 7 illustrates diagram 700 including one example of a scaling architecture for display processing. More specifically, diagram 700 includes scaling architecture for a display scaler or a DPU scaler. As shown in FIG. 7, diagram 700 includes pattern matching and corner detection component 710 (include non-maximum suppression), direction detection component 712, and finer direction estimation component 714 (including tri-directional estimation). Diagram 700 also includes local storage (LS) 720, directional pixel extractor 722, corner pixel extractor 724, triangle selector 730, directional phase computation component 732, vertical phase (Vphase) component 734, program pair selector 740, and directional phase computation component 742. Additionally, diagram 700 includes VphaseAccY component 750 (including inputs VphaseIncUV and VphaseIncY), VphaseAccUV component 752, HphaseAccY component 754 (including inputs HphaseIncUV and HphaseIncY), and HphaseAccUV component 756. Diagram 700 also includes bilinear interpolators 760-763, two-dimensional (2D) separable interpolators 765-768, directional fusion component 770, 2D separable filter 780, bilinear interpolators 781-784, corner fusion component 786, and pixel fusion component 790.

As shown in FIG. 7, diagram 700 is a top-level scaling architecture for a DPU scaler including components for corner detection, corner interpolation, edge detection, and edge interpolation. The corner detection components of diagram 700 include pattern matching and corner detection component 710, triangle selector 730, and directional phase computation component 732. The corner interpolation components of diagram 700 include bilinear interpolators 781-784 and corner fusion component 786. The corner detection and corner interpolation components are novel elements in the design of diagram 700. Also, a novel non-maximum suppression algorithm may be integrated with corner filtering that allows the novel elements to work in tandem with other features. The edge detection components of diagram 700 include direction detection component 712, finer direction estimation component 714, program pair selector 740, and directional phase computation component 742. Additionally, the edge interpolation components of diagram 700 include bilinear interpolators 760-763, two-dimensional (2D) separable interpolators 765-768, and directional fusion component 770. The edge detection and edge interpolation components may be modified to accommodate the newly-introduced filtering aspects along a third direction (e.g., 45° or −45°).

In aspects of the present disclosure, a combination block of fuzzy-logic based pattern detection and non-maximum suppression (or non-maxima suppression) may be a novel method to detect corners in an image while mitigating false corner detection on edges and vice-versa. Accordingly, aspects presented herein may include novel elements for scaling architecture (e.g., the corner detection and interpolation elements) which may also be viewed as standalone algorithms. Further, aspects presented herein may also provide for how these novel elements (e.g., the corner detection and interpolation elements) interact with the existing elements (e.g., edge-based filtering) by virtue of non-maximum suppression and information passing between the edge block and the corner filtering block. Based on an image quality assessment, aspects presented herein may better preserve high-frequency features that contribute to the structure of the objects in an image. Aspects presented herein may also outperform other traditional filtering-based image scaling techniques and certain artificial intelligence (AI)-based scalers for graphics or text use cases. Moreover, aspects presented herein may be implemented with any image/video processing task that may benefit from corner detection-based filtering. In particular, aspects presented herein may be utilized in displays that deal with graphics content (e.g., gaming displays).

In some instances, the pattern/corner detection of the present disclosure may be parameterized by a strength metric referred to as cornerness and a type metric referred to as corner type (CornerType), which may indicate the orientation of the corner. The algorithm may detect two categories of corners (e.g., category 1 corners and category 2 corners). The categories of corner may differ in their type of orientation. In some instances, the category with the lower detection strength may be discarded. Also, four sub-detections at pixels enclosing an interpolation region may be bilinearly blended to output a final cornerness value. In some aspects, each sub-detection may be carried out on a 3×3 luma grid.

Figure 8:
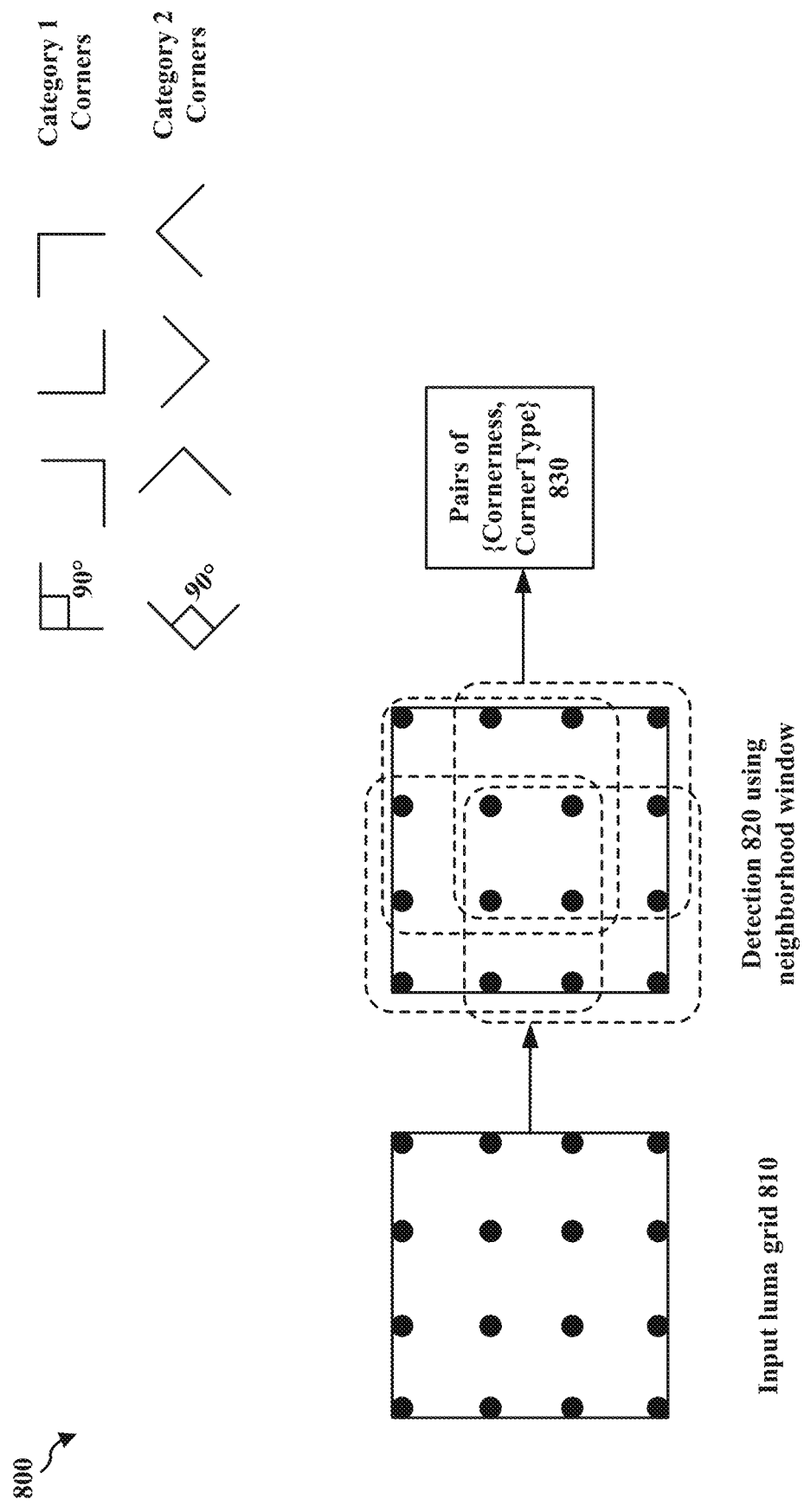
FIG. 8 is a diagram illustrating an example scaling technique for display processing.

FIG. 8 illustrates diagram 800 including one example of a scaling technique for display processing. More specifically, FIG. 8 depicts a sub-detection scheme and corner categorization. As shown in FIG. 8, diagram 800 includes input luma grid 810, detection block 830 (using neighborhood window), and pairs of cornerness and CornerType 830 (e.g., 4 pairs of cornerness and CornerType). FIG. 8 shows that detection block 830 utilizes a detection at four points using a 3×3 neighborhood window. FIG. 8 also depicts category 1 corners and category 2 corners (which are rotated by 45 degrees compared to category 1 corners).

In a category 1 corner detection (i.e., fuzzy logic-based pattern matching), the detection may be based on computing a correlation metric between the input grid and pre-defined patterns to parameterize the pattern strength. The correlation metric may be referred to as cornerness1. The detection process may include a number of different steps. For instance, the detection process may include a preprocessing step, where this step may take a 3×3 luma input and then output two 3×3 matrices called the partition matrices (i.e., Ep and En). Local luma statistics may be leveraged for preprocessing. The goal may be to partition the input grid into two regions of high luma polarity with respect to a center pixel. This high polarity may be exploited in the following pattern matching step. The pattern matching step may take four predefined patterns and match them against Ep and En to determine which pattern matches more closely with the luma input. Additionally, a non-maximum suppression block may be integrated to prevent false corner detection and mitigate interference with the directional detection.

Figure 9:
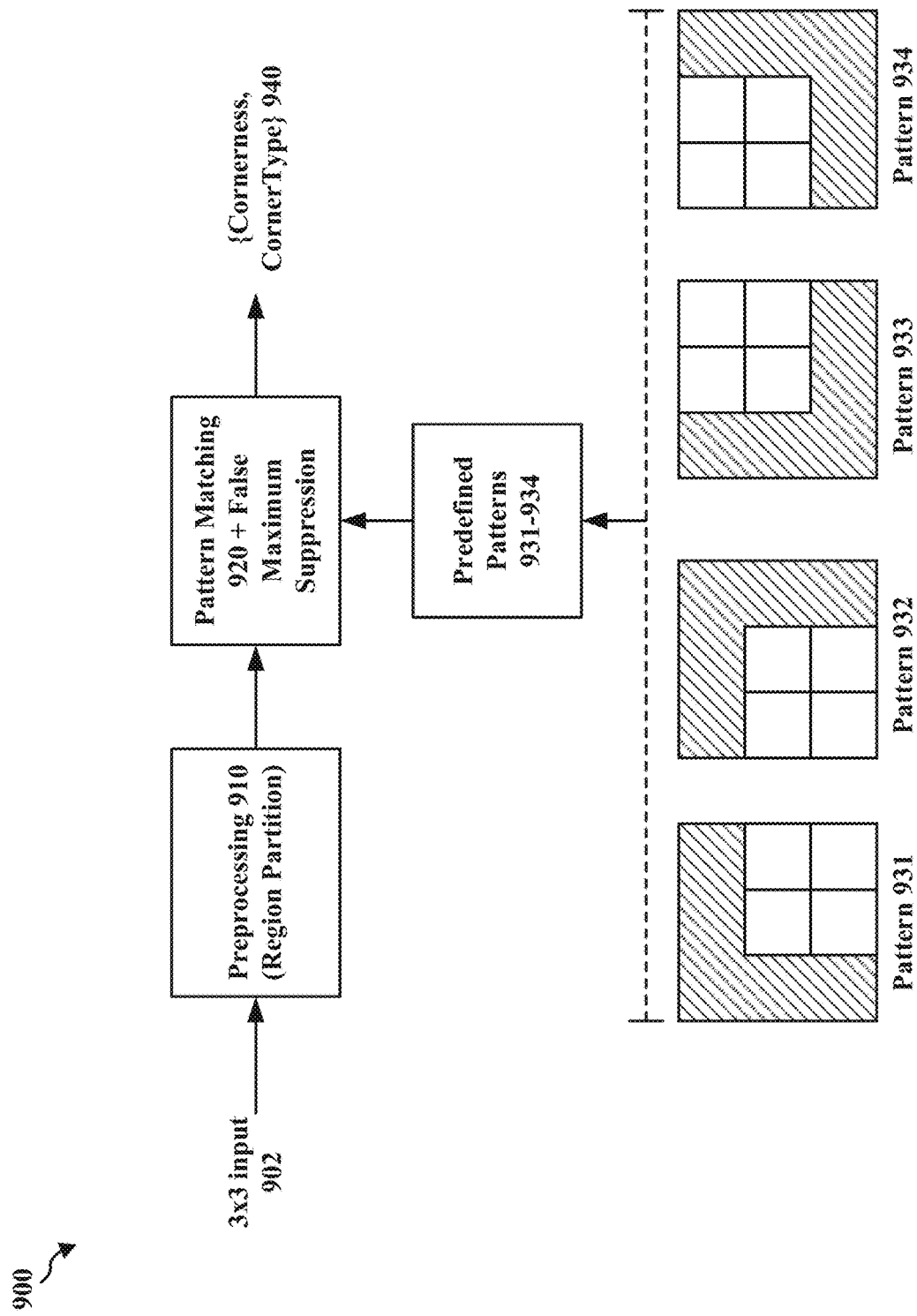
FIG. 9 is a diagram illustrating an example scaling technique for display processing.

FIG. 9 illustrates diagram 900 including one example of a scaling technique for display processing. More specifically, FIG. 9 depicts a high-level scheme of fuzzy logic pattern detection. As shown in FIG. 9, diagram 900 includes 3×3 input 902, preprocessing component 910 (i.e., region partition component), pattern matching component 920 (including false maximum suppression), predefined patterns 931-934 (3×3 patterns), and cornerness and CornerType 940. Predefined patterns 931-934 illustrate the four orientations of patterns detected under category 1. Also, each of patterns 931-934 may be of a size 3×3 and may be divided into two regions (e.g., regions A and B) that have opposite luma polarity.

Figure 10:
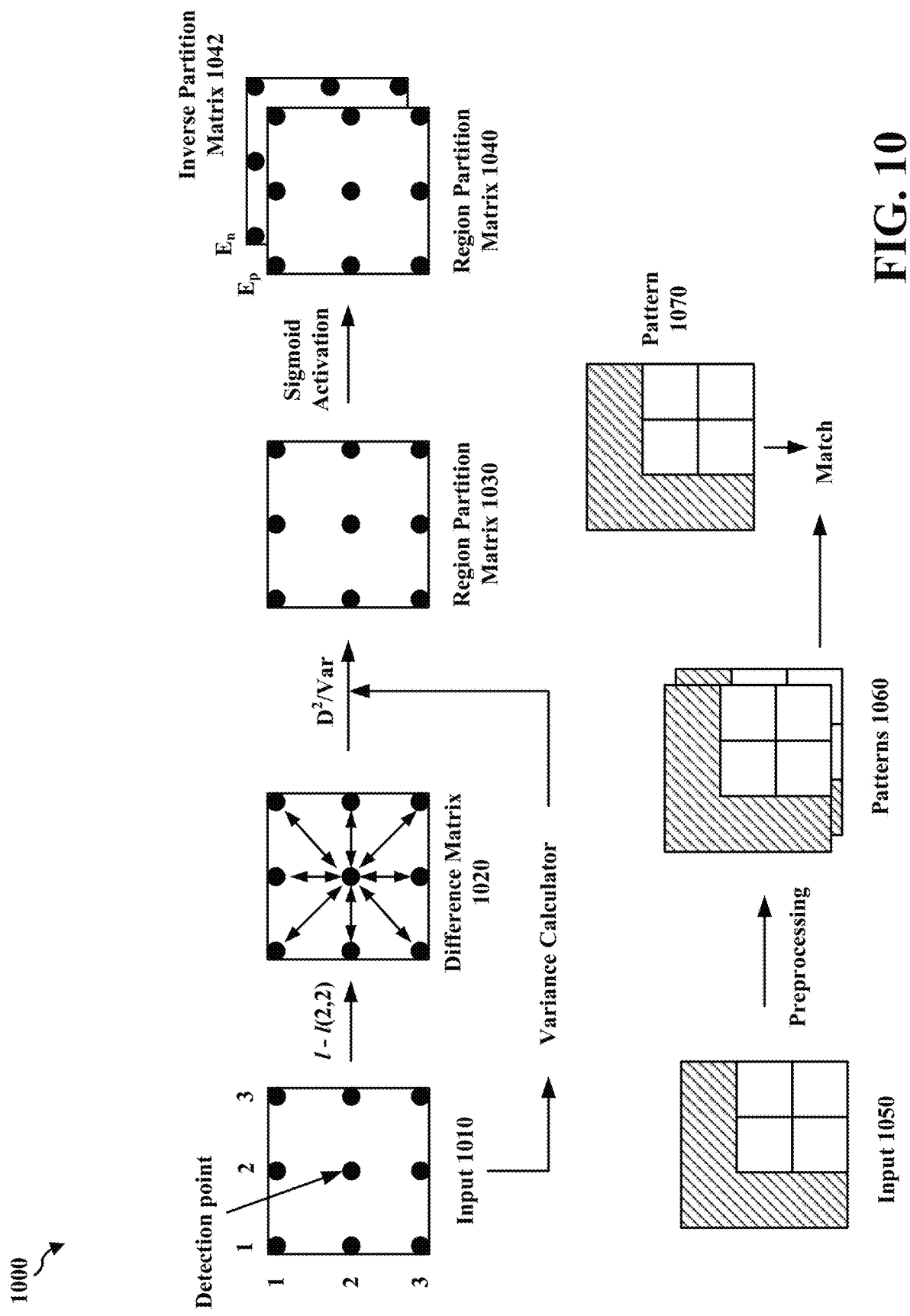
FIG. 10 is a diagram illustrating an example scaling technique for display processing.

FIG. 10 illustrates diagram 1000 including one example of a scaling technique for display processing. More specifically, FIG. 10 depicts a low-level flow diagram of a preprocessing step. As shown in FIG. 10, diagram 1000 includes input 1010 (3×3 input) including detection point, difference matrix 1020, region partition matrix 1030, region partition matrix 1040 (Ep), and inverse partition matrix 1042 (En). FIG. 10 depicts that there is a variance calculator for input 1010 and difference matrix 1020. Also, there is a sigmoid activation step after region partition matrix 1030. As shown in FIG. 10, diagram 1000 also includes input 1050, which undergoes preprocessing to produce patterns 1060. Additionally, pattern 1070 is compared to patterns 1060 to determine if there is a matching pattern.

Figure 11:
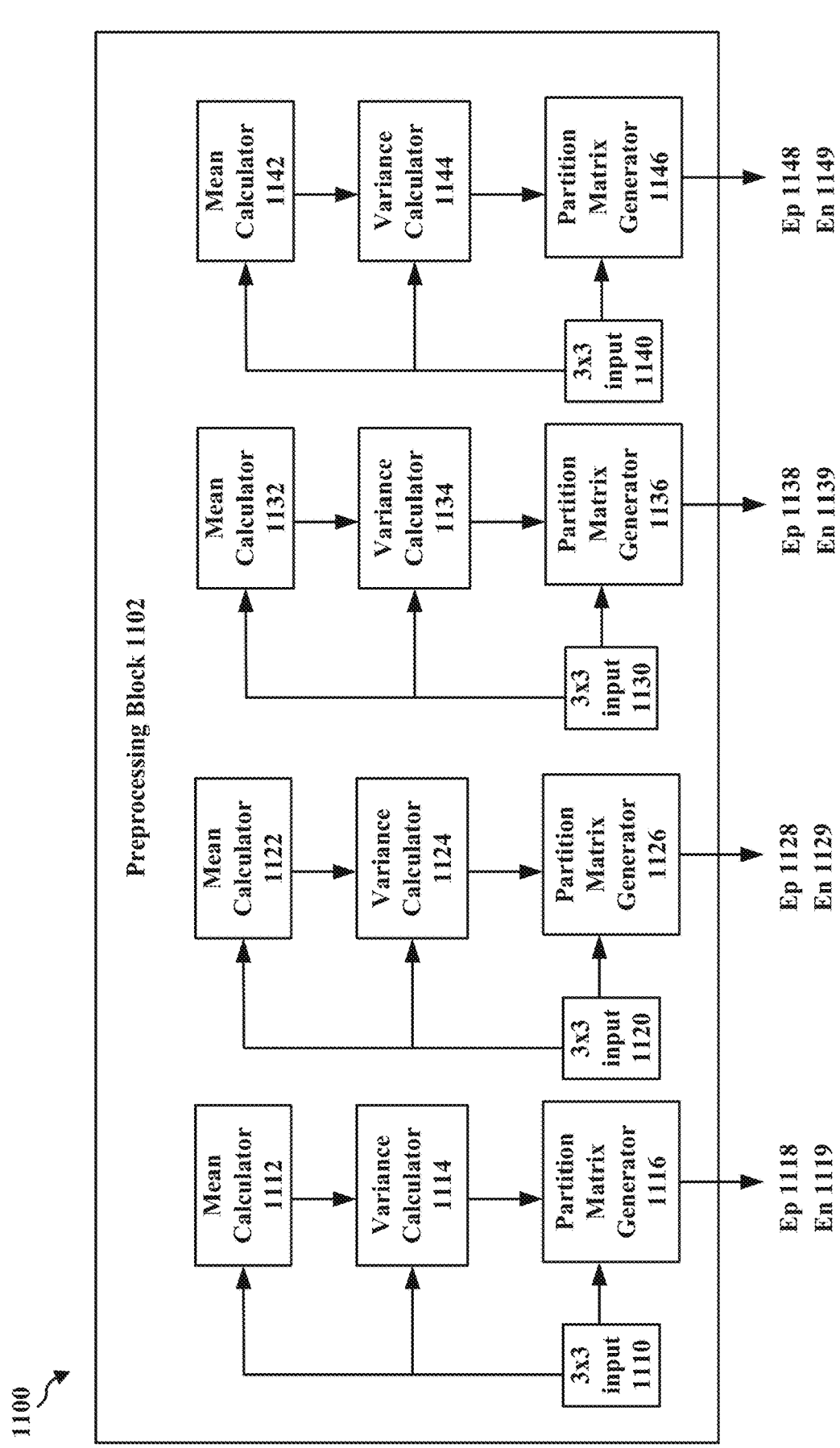
FIG. 11 is a diagram illustrating an example scaling architecture for display processing.

FIG. 11 illustrates diagram 1100 including one example of a scaling architecture for display processing. As shown in FIG. 11, diagram 1100 includes preprocessing block 1102 which includes 3×3 input 1110, mean calculator 1112, variance calculator 1114, partition matrix generator 1116, Ep 1118, and En 1119. FIG. 11 depicts that preprocessing block 1102 includes four similar instances, e.g., one for each 3×3 sub-window. For instance, preprocessing block 1102 includes 3×3 input 1120, mean calculator 1122, variance calculator 1124, partition matrix generator 1126, Ep 1128, and En 1129. Preprocessing block 1102 also includes 3×3 input 1130, mean calculator 1132, variance calculator 1134, partition matrix generator 1136, Ep 1138, and En 1139. Further, preprocessing block 1102 includes 3×3 input 1140, mean calculator 1142, variance calculator 1144, partition matrix generator 1146, Ep 1148, and En 1149.

In some instances, aspects presented herein may include a case-wise breakdown of the pattern matching step. For instance, the input in two cases may differ in polarity, but have the same pattern. In one case, aspects presented herein may add all of the values in a region (e.g., region A) in Ep and add all values in a region (e.g., region B) in En. This may correspond to the following formula:

$$\mu_c(m, n) = \frac{1}{20}\max\left[\left(\sum_{ij:A}E^p(i,j)\right)\left(\sum_{ij:B}E^n(i,j)\right), \left(\sum_{ij:B}E^p(i,j)\right)\left(\sum_{ij:A}E^n(i,j)\right)\right]$$

where $\mu_c$ stands for Cornerness1 and $\text{Index}_{type}$ stands for CornerType. Also, $\text{Index}_{type}$ may be equal to $\text{Index}_{max}\mu_c$. In some instances, the first product in the formula may result in a higher value. In other instances, the second product in the formula may result in a higher value. In case of a perfect match, one of the two products may be 20.

Figure 12:
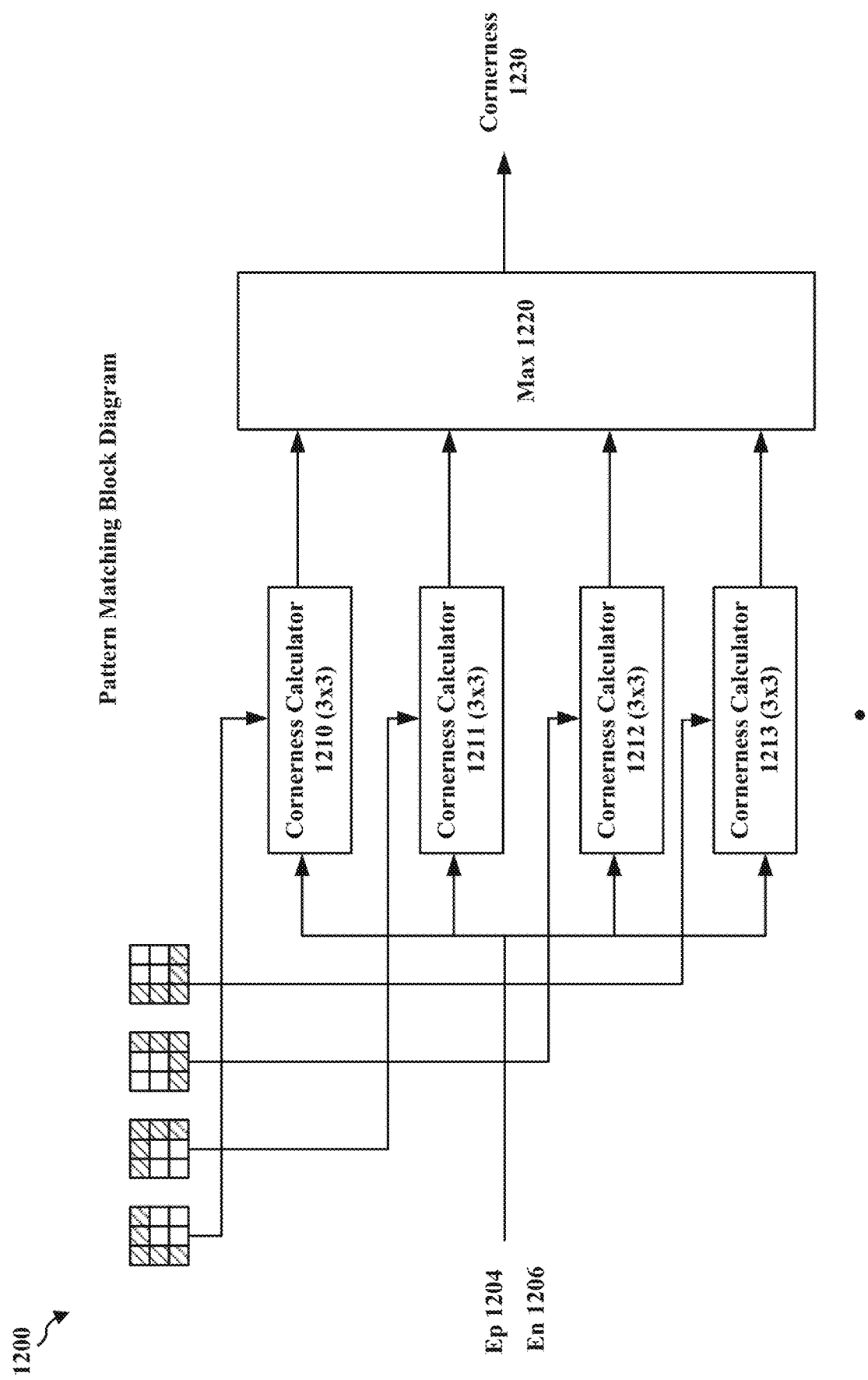
FIG. 12 is a diagram illustrating an example scaling architecture for display processing.

FIG. 12 illustrates diagram 1200 including one example of a scaling architecture for display processing. More specifically, FIG. 12 depicts a pattern matching block diagram. As shown in FIG. 12, diagram 1200 includes Ep 1204, En 1206, cornerness calculator 1210, cornerness calculator 1211, cornerness calculator 1212, cornerness calculator 1213, maximum component 1220, and cornerness 1230. FIG. 12 depicts that there may be 4 identical pattern matching blocks (e.g., one for each of the 3×3 input). Each of these blocks may have 4 identical sub-blocks (e.g., one for each of the 4 patterns). Accordingly, the diagram 1200 in FIG. 12 may include 4 times the amount of components compared to the current diagram.

Figure 13:
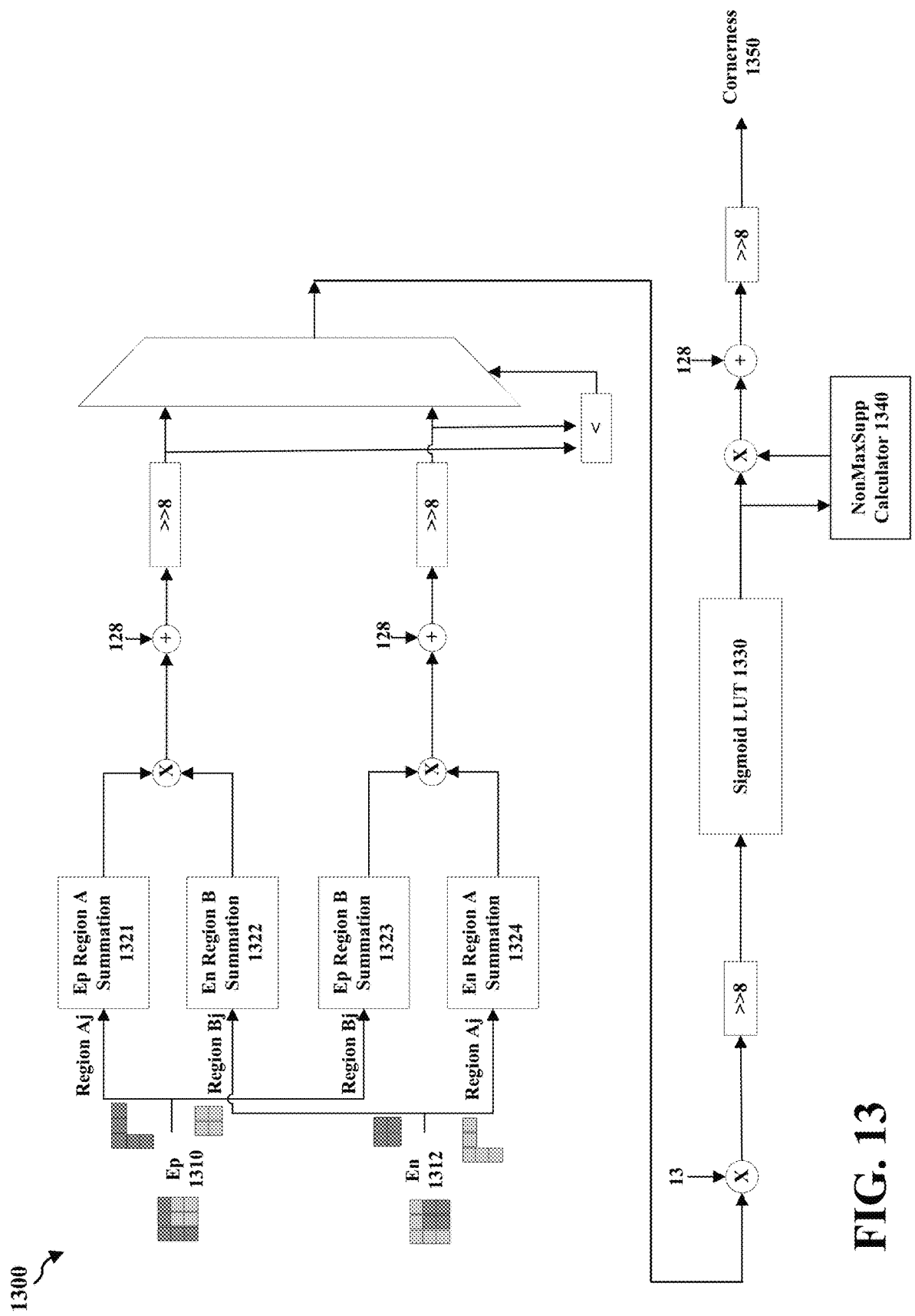
FIG. 13 is a diagram illustrating an example scaling architecture for display processing.

FIG. 13 illustrates diagram 1300 including one example of a scaling architecture for display processing. As shown in FIG. 13, diagram 1300 includes Ep 1310, En 1312, Ep region A summation component 1321, En region B summation component 1322, Ep region B summation component 1323, En region A summation component 1324, sigmoid look-up table (LUT) 1330, non-maximum suppression calculator 1340, and cornerness 1350. FIG. 13 depicts a diagram for a cornerness calculator. For example, FIG. 13 depicts Cornerness1 modulation through a sigmoid activation step and a non-maximum suppression step.

In some aspects, the non-maximum suppression calculation may correspond to the following formula:

$$NonMaxSup = \frac{(|GST| - \mu_c)}{(|GST| + \mu_c)} * (1 - |GST|),$$

where GST stands for gradient square tensor. In some instances, the non-maximum suppression may be approximately equal to zero. Also, the non-maximum suppression may correspond to: 0<NonMaxSup<1, which may allow for faint false detection along horizontal and vertical lines that may be advantageous to provide sharper horizontal and vertical edges. GST is a metric used to parameterize edge strength (which is taken to be strongest when the edge is along the diagonal). GST may also include variation with an edge angle. In some cases, an input example for false detection may include micro-corners present in edges. Further, non-maximum suppression may prevent false corner detection. Additionally, consistent and faint false detection may allow for partial bilinear/corner interpolation (e.g., where NonMaxSup=1). In some examples, a 4×4 interpolation may correspond to a 2×2 interpolation. This may result in a number of advantages, such as sharper horizontal and vertical lines, a reduced halo artifact, and/or a reinforced corner sharpness. Also, this may be calculated utilizing a bicubic filtering function or a bilinear sigmoidal function.

Aspects of the present disclosure may also utilize category 2 corner detection (i.e., corner detection using second order luma gradients). Category 2 detection may compute the magnitude of a change in strength between the edges that intersect to form a corner. The strength metric that quantifies this magnitude of change may be referred to as Cornerness2. Edge strength may be parameterized by a set of metrics called gradient square tensors (GSTs) which are derived using first order luma gradients. The second-order gradients (ΔGSTs) may be calculated as the difference between two first-order gradients calculated on adjacent 3×5 luma grids.

Figure 14:
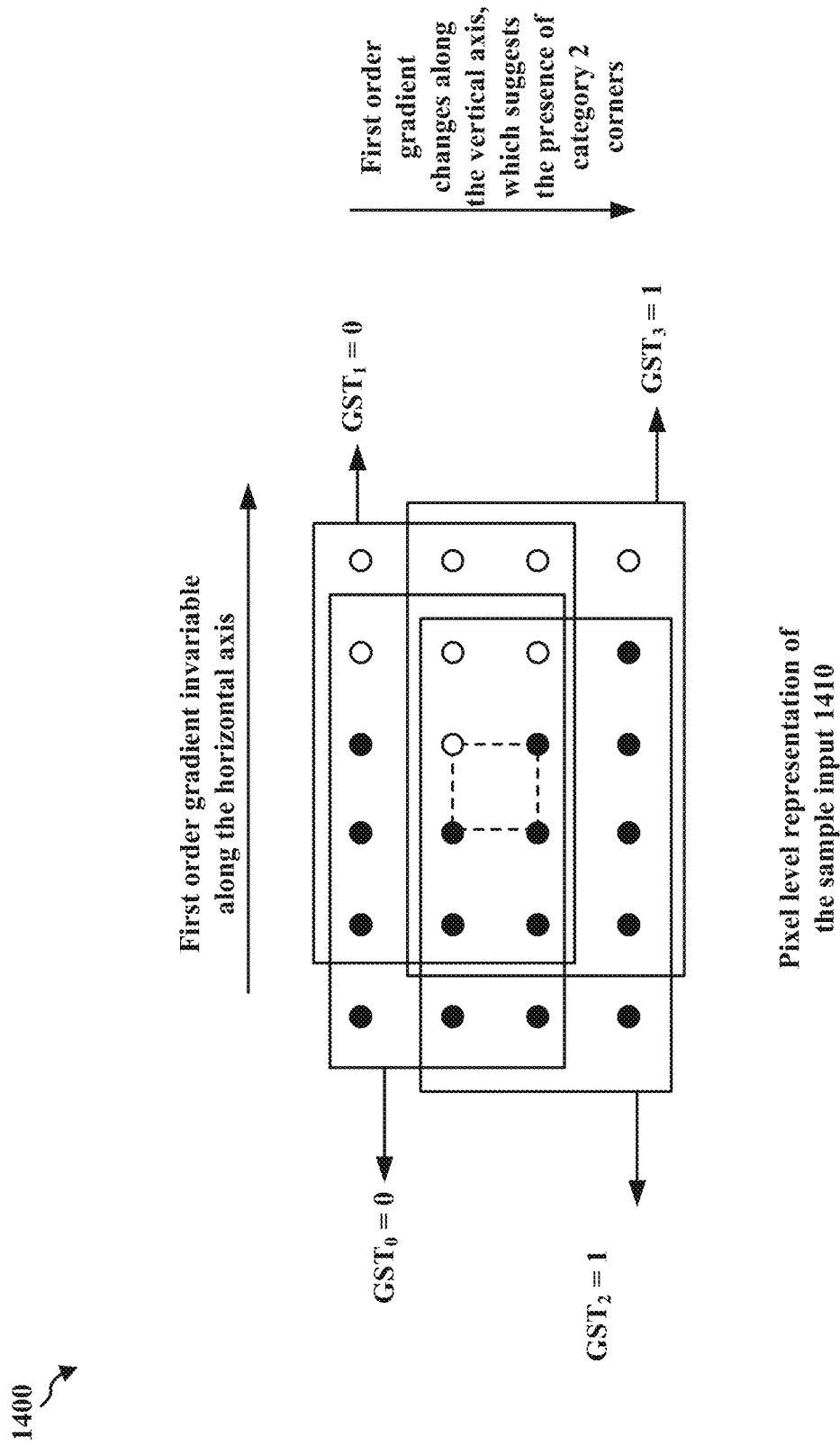
FIG. 14 is a diagram illustrating an example scaling technique for display processing.

FIG. 14 illustrates diagram 1400 including one example of a scaling technique for display processing. As shown in FIG. 14, diagram 1400 includes a pixel level representation of the sample input 1410, as well as four GSTs (e.g., $GST_0=0$, $GST_1=0$, $GST_2=1$, $GST_3=1$). FIG. 14 depicts how the first order gradient may vary in horizontal and vertical directions for a sample input and how it may help with category 2 detection. Additionally, a first order gradient may be invariable along the horizontal axis. Also, the first order gradient may change along the vertical axis, which suggests the presence of category 2 corners.

Aspects of the present disclosure may also utilize corner interpolation. The corner interpolation may follow the corner detection and may be a function of the detected CornerType index. For example, four sub-interpolations may be independently calculated for each of four 3×3 grids and then may be blended bilinearly to obtain the final corner filter output. The interpolation filter may be a modified bilinear filter and may use three pixels (together called a triangle) instead of four pixels.

Figure 15:
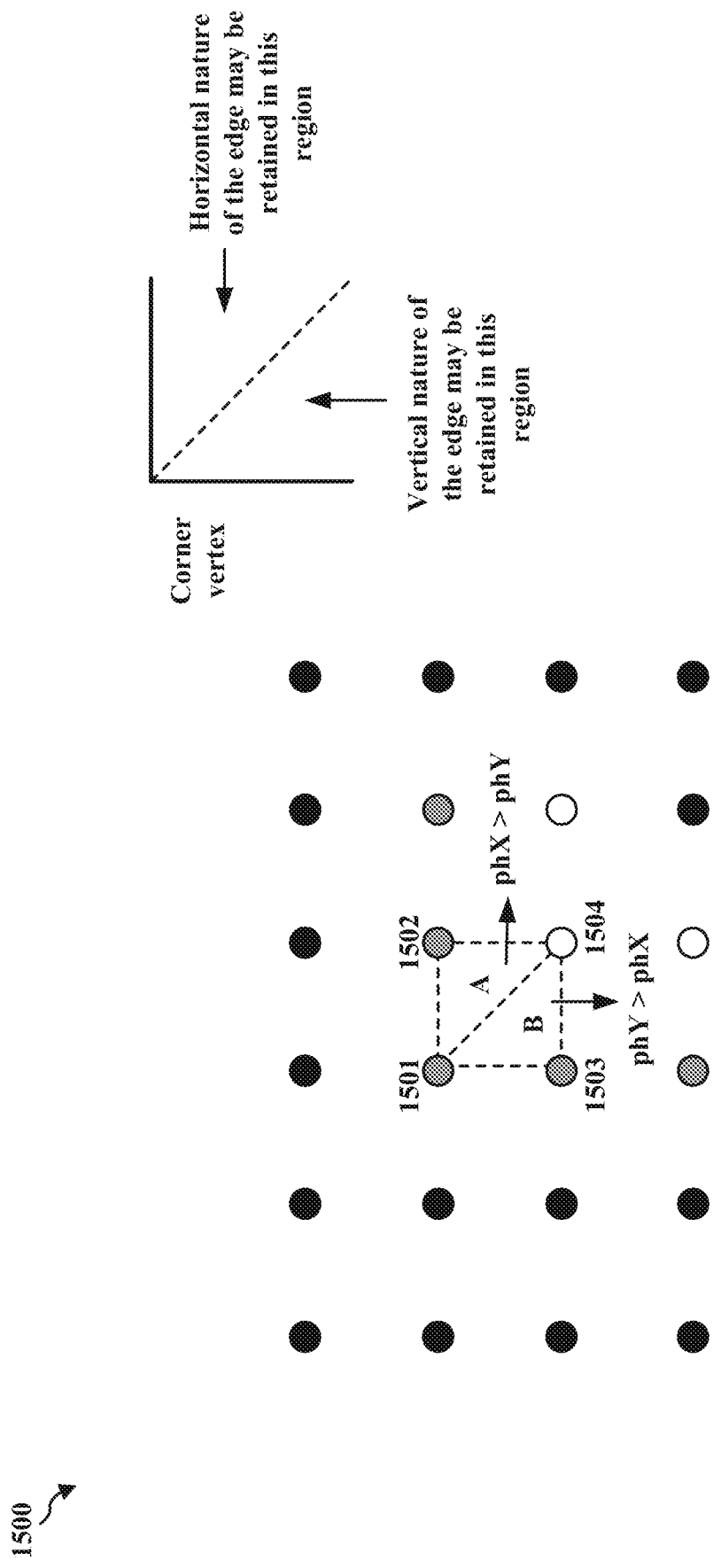
FIG. 15 is a diagram illustrating an example scaling technique for display processing.

FIG. 15 illustrates diagram 1500 including one example of a scaling technique for display processing. More specifically, FIG. 15 depicts a corner interpolation technique according to the present disclosure. As shown in FIG. 15, diagram 1500 includes pixel 1501, pixel 1502, pixel 1503, and pixel 1504. FIG. 15 depicts an example of a category 1 corner interpolation. PhX and PhY represent the horizontal and vertical distances of the output pixel from pixel 1501.

The ph1 and ph2 values (referred to as the directional phases) represent the distance weight values used for bilinear interpolation. As shown in FIG. 15, the horizontal nature of the edge may be retained in one region, while the vertical nature of the edge may be retained in another region. In some instances, category 1 triangular interpolation may be blended with an orientation agnostic interpolation. By doing so, aspects presented herein may (i) ensure a smooth transition between corner and non-corner interpolation, and (ii) exploit false corner detection to preserve horizontal and vertical edges better. Orientation agnostic interpolation may be a simple bilinear interpolation using ph1 and ph2.

Figure 16:
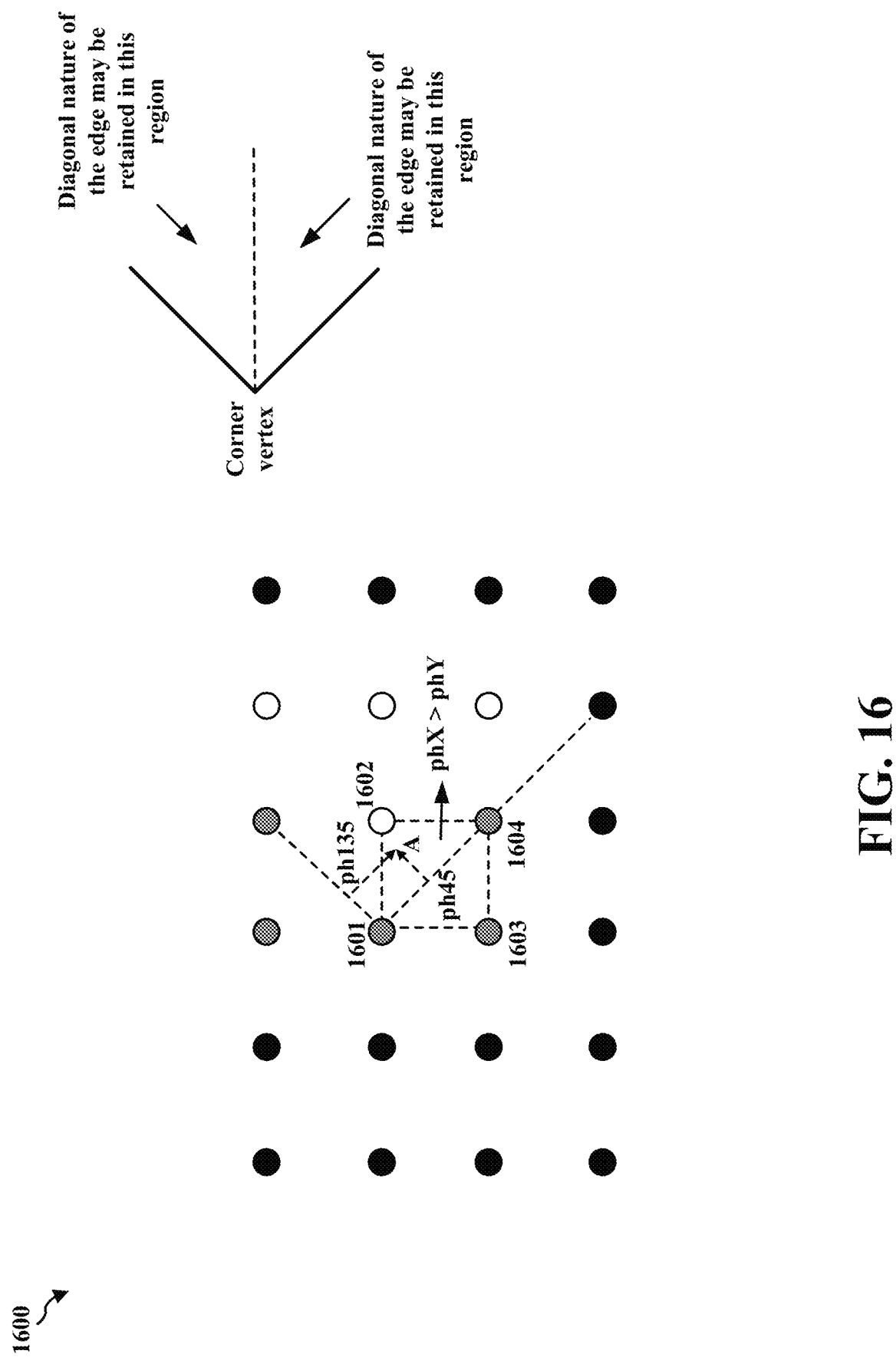
FIG. 16 is a diagram illustrating an example scaling technique for display processing.

FIG. 16 illustrates diagram 1600 including one example of a scaling technique for display processing. More specifically, FIG. 16 depicts a category 2 corner interpolation technique according to the present disclosure. As shown in FIG. 16, diagram 1600 includes pixel 1601, pixel 1602, pixel 1603, and pixel 1604. FIG. 16 depicts an example of a category 2 corner interpolation. PhX and PhY represent the horizontal and vertical distances of the output pixel from pixel 1601. The ph45 and ph135 values (referred to as the directional phases) represent the distance weight values used for bilinear interpolation. As shown in FIG. 16, the diagonal nature of the edge may be retained in one region, and the diagonal nature of the edge may be retained in another region.

Figure 17:
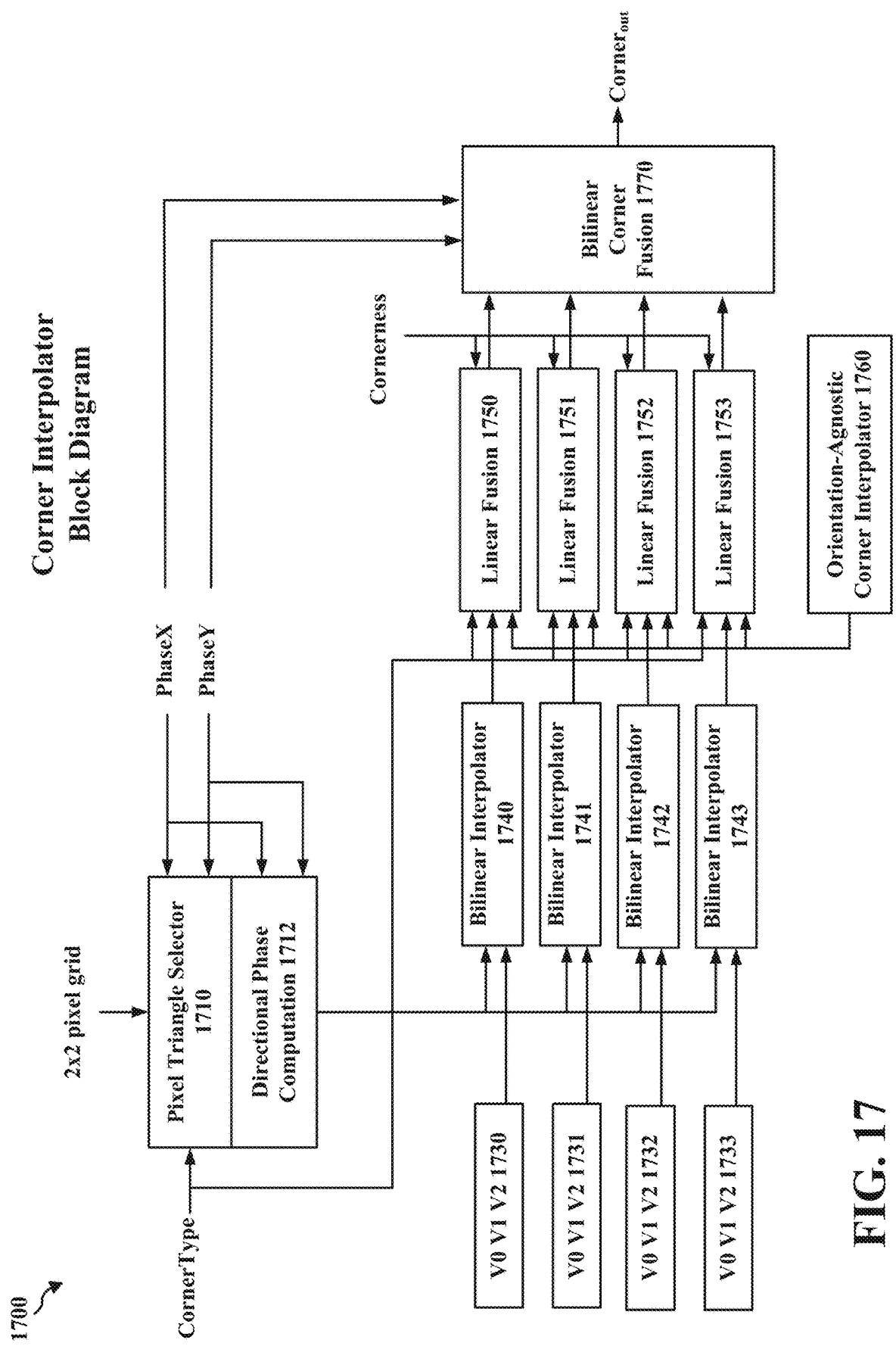
FIG. 17 is a diagram illustrating an example scaling architecture for display processing.

FIG. 17 illustrates diagram 1700 including one example of a scaling architecture for display processing. More specifically, FIG. 17 depicts a corner interpolation block diagram according to the present disclosure. As shown in FIG. 17, diagram 1700 includes pixel triangle selector 1710, directional phase computation component 1712, V0V1V2 components 1730-1733, bilinear interpolators 1740-1743, linear fusion components 1750-1753, orientation-agnostic corner interpolator 1760, and bilinear corner fusion component 1770. FIG. 17 depicts that the CornerType and a 2×2 pixel grid are input to pixel triangle selector 1710. The pixel triangle selector 1710 may also utilize PhaseX and PhaseY when communicating with bilinear corner fusion component 1770, which may then output the corner$_{out}$ value. FIG. 17 also depicts 4 parallel paths, which include one path for each 3×3 sub-window.

Aspects presented herein may also utilize tri-directional edge filtering. The current edge filtering may leverage a bidirectional filtering where edge filtering is estimated along 63° and 26° directions (or −63° and −26° directions) and linearly blended based on a strength metric called the finer direction estimation (FDE). Aspects of the present disclosure may add a third estimation along 45° and 135° directions for an improved preservation of edges, especially those oriented close to diagonal directions where edge filtering strength is at a maximum. The scheme utilized by aspects presented herein may be analogous for negative directions, i.e., when the detected edge is along a negative direction. For instance, the 63°/−63° and 26°/−26° interpolations may be defined in the current algorithm while the 45°/135° directional filtering block may be novel. The 45°/135° directional filtering block may use four 3×3 2D separable filters. The selection between 45° and 135° kernels may depend on the sign of the detected edge (indicated by the sign of GST metric). Also, the outputs of the 4 separable filters may be bilinearly blended to obtain the directional output.

Figure 18:
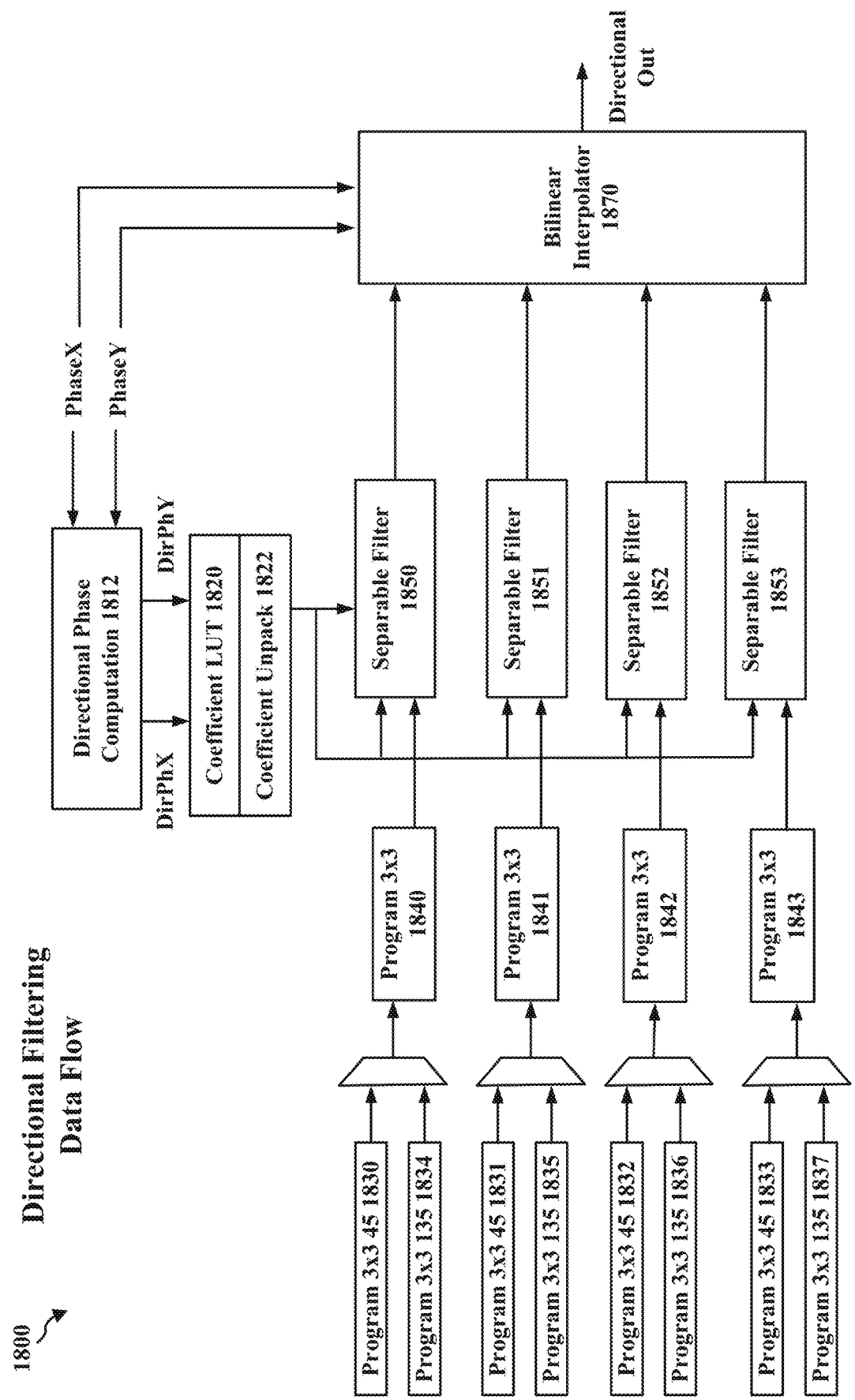
FIG. 18 is a diagram illustrating an example scaling architecture for display processing.

FIG. 18 illustrates diagram 1800 including one example of a scaling architecture for display processing. More specifically, FIG. 18 depicts a data flow for the 45°/135° directional filtering block. As shown in FIG. 18, diagram 1800 includes directional phase computation component 1812, coefficient look-up table (LUT) 1820, coefficient unpack component 1822, program 3×3 45° components 1830-1833, program 3×3 135° components 1834-1837, program 3×3 components 1840-1843, separable filters 1850-1853, and bilinear interpolator 1870. FIG. 18 depicts that direct PhX and direct PhY are communicated from directional phase computation component 1812 to coefficient look-up table (LUT) 1820. Also, PhaseX and PhaseY are communicated between directional phase computation component 1812 and bilinear interpolator 1870. Finally, bilinear interpolator 1870 may output the directional out.

Aspects presented herein may also utilize a pixel fusion process, e.g., blending corner filtering, directional filtering, and bicubic filtering. In pixel fusion, the tri-directional output ($out_{triDir}$) from the directional filtering block and the bicubic filter output may be combined using GST weights (which represents edge strength). Also, the cornerness output ($out_{cor}$) coming from corner filter block and the $out_{triDir}$ may be combined using cornerness to provide the final output pixel.

Figure 19:
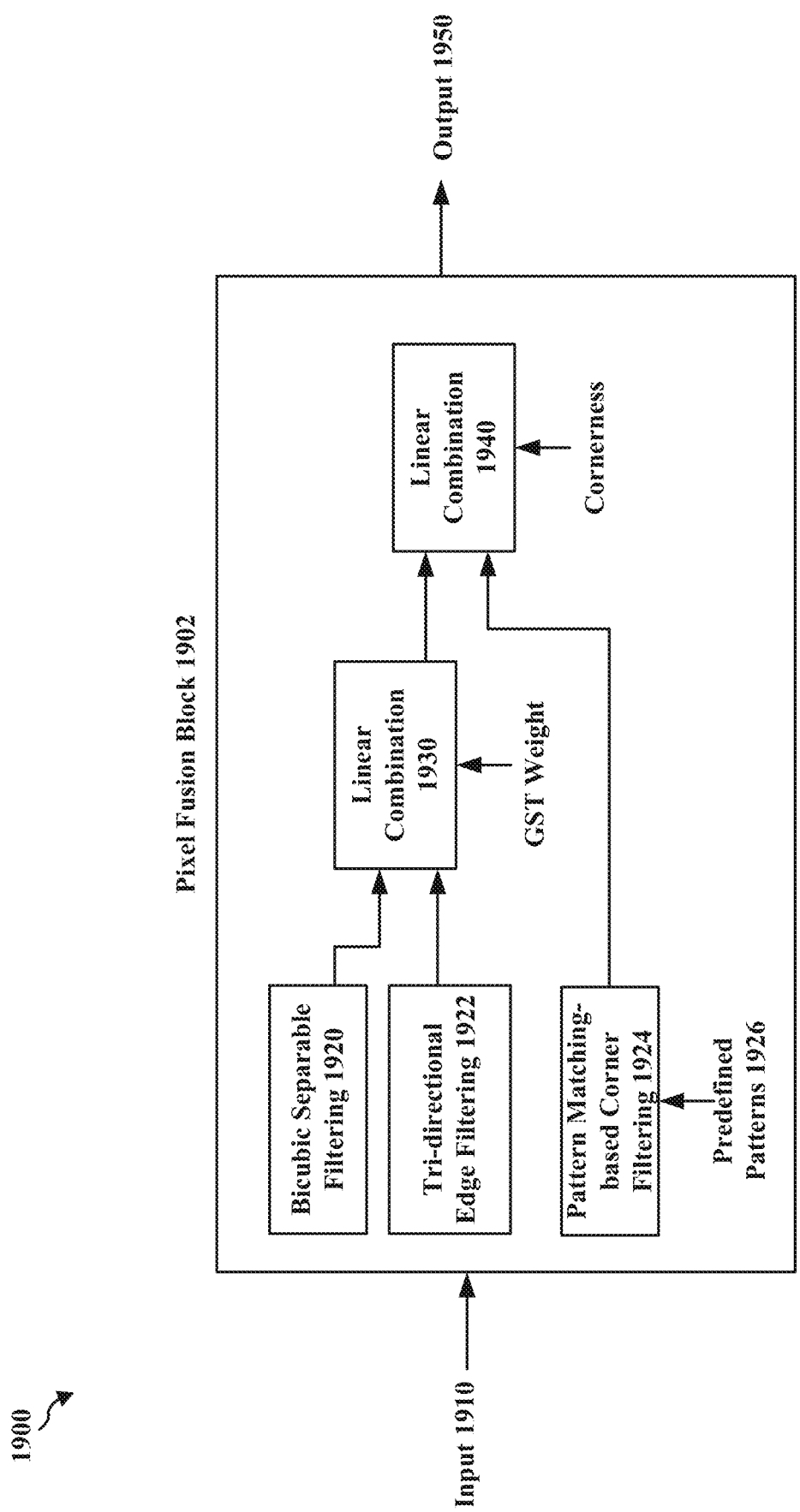
FIG. 19 is a diagram illustrating an example scaling technique for display processing.

FIG. 19 illustrates diagram 1900 including one example of a scaling technique for display processing. More specifically, FIG. 19 depicts a pixel fusion block architecture. As shown in FIG. 19, diagram 1900 includes input 1910, output 1950, and pixel fusion block 1902 including bicubic separable filtering component 1920, tri-directional edge filtering component 1922, pattern matching-based corner filtering component 1924, predefined patterns 1926, linear combination 1930 (including GST weight), and linear combination 1940 (including cornerness). As depicted in FIG. 19, in some instances, $out_{Dir}=GST*out_{triDir}+(1-GST)*out_{bicubic}$. Also, in some instances, $out_{final}=cornerness*out_{cor}+(1-cornerness)*out_{dir}$.

Aspects of the present disclosure may include a number of benefits or advantages. For instance, aspects of the present disclosure better preserve the high-frequency features that contribute to the structure of objects in an image. Aspects presented herein may also outperform other traditional filtering-based image scaling techniques, as well as certain AI-based scalers for graphics use cases or text use cases.

Figure 20:
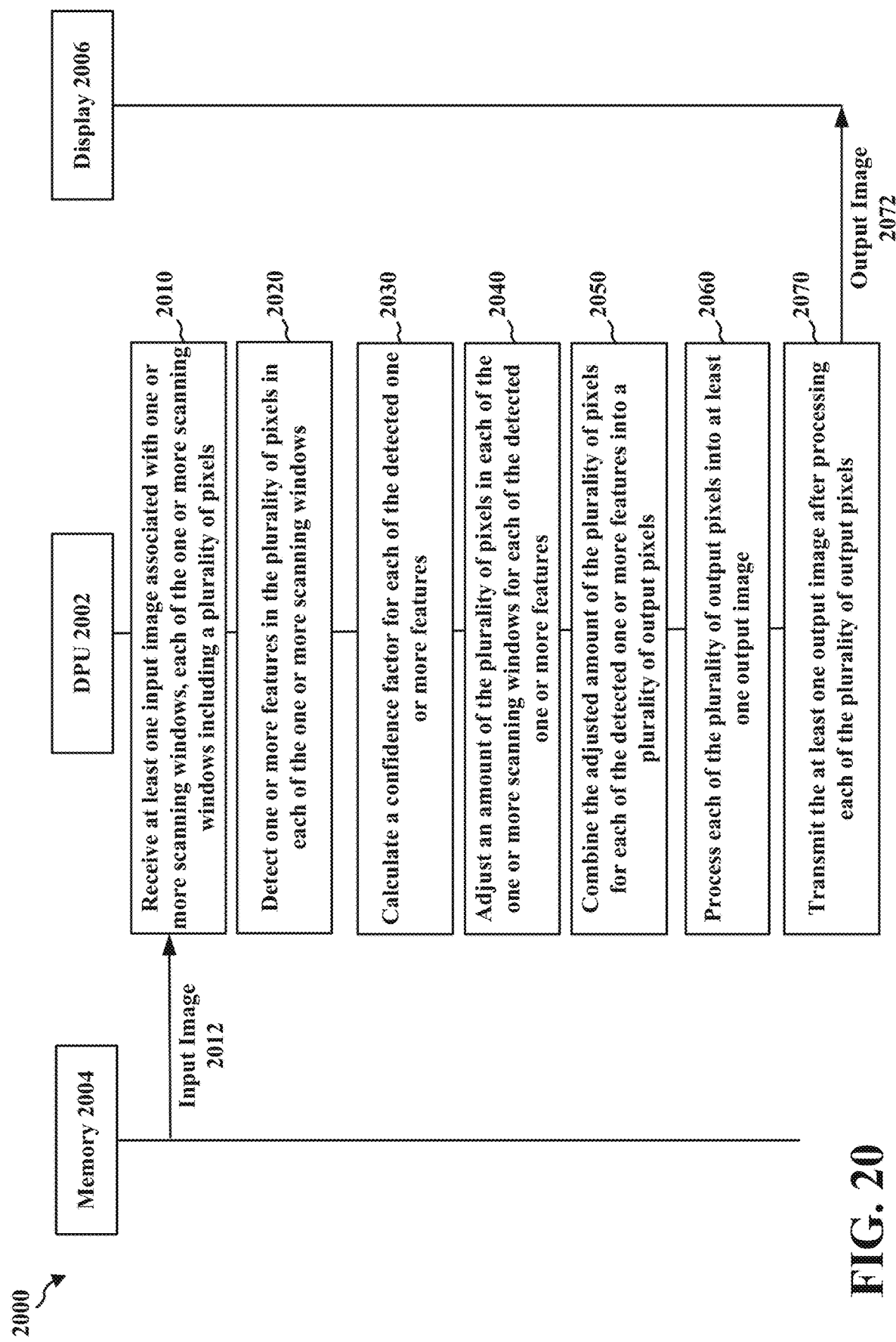
FIG. 20 is a communication flow diagram illustrating example communications between a memory, a DPU, and a display.

FIG. 20 is a communication flow diagram 2000 of display processing in accordance with one or more techniques of this disclosure. As shown in FIG. 20, diagram 2000 includes example communications between DPU 2002 (or other display processor), memory 2004, and display 2006 (e.g., a display panel), in accordance with one or more techniques of this disclosure.

At 2010, DPU 2002 may receive at least one input image (e.g., input image 2012) for a scaling operation, the at least one input image being associated with one or more scanning windows, each of the one or more scanning windows including a plurality of pixels. In some aspects, the one or more scanning windows may be one or more pixel grids.

At 2020, DPU 2002 may detect one or more features in the plurality of pixels in each of the one or more scanning windows. The one or more features in the plurality of pixels in each of the one or more scanning windows may include at least one of one or more corners or one or more edges. The one or more corners may include one or more category 1 corners and one or more category 2 corners, where the one or more category 1 corners may be associated with a non-rotated horizontal axis and a non-rotated vertical axis and the one or more category 2 corners may be associated with a 45-degree rotated horizontal axis and a 45-degree rotated vertical axis.

At 2030, DPU 2002 may calculate a confidence factor for each of the detected one or more features in the plurality of pixels in each of the one or more scanning windows. In some instances, the calculation of the confidence factor for each of the one or more features may correspond to a non-maximum suppression process. The confidence factor for each of the one or more features may correspond to a confidence in an accuracy of each of the one or more features, where the confidence factor may be a value between 0 and 1. Also, the combination of the adjusted amount of the plurality of pixels may be based on the confidence factor for each of the one or more features. Further, the one or more features may include one or more corners and one or more edges, where the confidence factor may be an edge strength metric for each of the one or more edges and a corner strength metric for each of the one or more corners.

At 2040, DPU 2002 may adjust an amount of the plurality of pixels in each of the one or more scanning windows for each of the detected one or more features. In some aspects, adjusting the amount of the plurality of pixels in each of the one or more scanning windows may adjust a pixel resolution of the one or more scanning windows. Also, the adjustment of the amount of the plurality of pixels in each of the one or more scanning windows may correspond to corner interpolation or edge interpolation. The edge interpolation may be associated with tri-directional edge filtering and the corner interpolation may be associated with pattern matching-based corner filtering.

At 2050, DPU 2002 may combine the adjusted amount of the plurality of pixels for each of the detected one or more features into a plurality of output pixels. The combination of the adjusted amount of the plurality of pixels for each of the detected one or more features may be a linear combination.

At 2060, DPU 2002 may process each of the plurality of output pixels into at least one output image. In some instances, the DPU may scan each of the plurality of output pixels, where each of the plurality of output pixels may be scanned in a scanning order. For instance, processing each of the plurality of output pixels may include scanning each of the plurality of output pixels, where each of the plurality of output pixels may be scanned in a scanning order. Additionally, each of the plurality of output pixels may be processed at a display processing unit (DPU) or a DPU scaler.

At 2070, DPU 2002 may transmit, to a display or a panel (e.g., display 2006), the at least one output image (e.g., output image 2072) after processing each of the plurality of output pixels.

Figure 21:
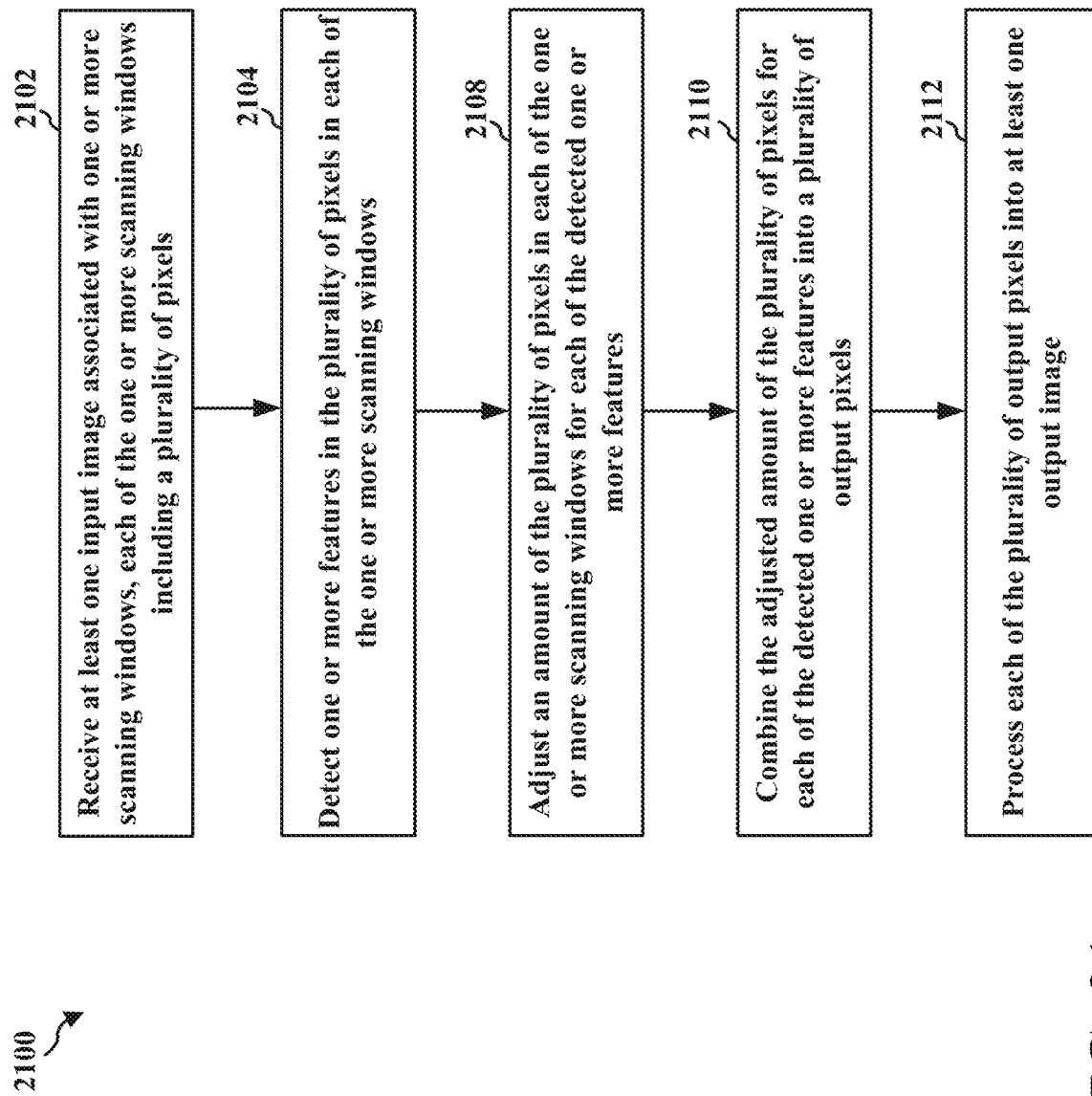
FIG. 21 is a flowchart of an example method of display processing.

FIG. 21 is a flowchart 2100 of an example method of display processing in accordance with one or more techniques of this disclosure. The method may be performed by a DPU, such as an apparatus for display processing, a display processor, a wireless communication device, and/or any apparatus that may perform display processing as used in connection with the examples of FIGS. 1-20.

At 2102, the DPU may receive at least one input image for a scaling operation, the at least one input image being associated with one or more scanning windows, each of the one or more scanning windows including a plurality of pixels, as described in connection with the examples in FIGS. 1-20. For example, as described in 2010 of FIG. 20, DPU 2002 may receive at least one input image for a scaling operation, the at least one input image being associated with one or more scanning windows, each of the one or more scanning windows including a plurality of pixels. Further, step 2102 may be performed by display processor 127 in FIG. 1. In some aspects, the one or more scanning windows may be one or more pixel grids.

At 2104, the DPU may detect one or more features in the plurality of pixels in each of the one or more scanning windows, as described in connection with the examples in FIGS. 1-20. For example, as described in 2020 of FIG. 20, DPU 2002 may detect one or more features in the plurality of pixels in each of the one or more scanning windows. Further, step 2104 may be performed by display processor 127 in FIG. 1. The one or more features in the plurality of pixels in each of the one or more scanning windows may include at least one of one or more corners or one or more edges. The one or more corners may include one or more category 1 corners and one or more category 2 corners, where the one or more category 1 corners may be associated with a non-rotated horizontal axis and a non-rotated vertical axis and the one or more category 2 corners may be associated with a 45-degree rotated horizontal axis and a 45-degree rotated vertical axis.

At 2108, the DPU may adjust an amount of the plurality of pixels in each of the one or more scanning windows for each of the detected one or more features, as described in connection with the examples in FIGS. 1-20. For example, as described in 2040 of FIG. 20, DPU 2002 may adjust an amount of the plurality of pixels in each of the one or more scanning windows for each of the detected one or more features. Further, step 2108 may be performed by display processor 127 in FIG. 1. In some aspects, adjusting the amount of the plurality of pixels in each of the one or more scanning windows may adjust a pixel resolution of the one or more scanning windows. Also, the adjustment of the amount of the plurality of pixels in each of the one or more scanning windows may correspond to corner interpolation or edge interpolation. The edge interpolation may be associated with tri-directional edge filtering and the corner interpolation may be associated with pattern matching-based corner filtering.

At 2110, the DPU may combine the adjusted amount of the plurality of pixels for each of the detected one or more features into a plurality of output pixels, as described in connection with the examples in FIGS. 1-20. For example, as described in 2050 of FIG. 20, DPU 2002 may combine the adjusted amount of the plurality of pixels for each of the detected one or more features into a plurality of output pixels. Further, step 2110 may be performed by display processor 127 in FIG. 1. The combination of the adjusted amount of the plurality of pixels for each of the detected one or more features may be a linear combination.

At 2112, the DPU may process each of the plurality of output pixels into at least one output image, as described in connection with the examples in FIGS. 1-20. For example, as described in 2060 of FIG. 20, DPU 2002 may process each of the plurality of output pixels into at least one output image. Further, step 2112 may be performed by display processor 127 in FIG. 1. In some instances, the DPU may scan each of the plurality of output pixels, where each of the plurality of output pixels may be scanned in a scanning order. For instance, processing each of the plurality of output pixels may include scanning each of the plurality of output pixels, where each of the plurality of output pixels may be scanned in a scanning order. Additionally, each of the plurality of output pixels may be processed at a display processing unit (DPU) or a DPU scaler.

Figure 22:
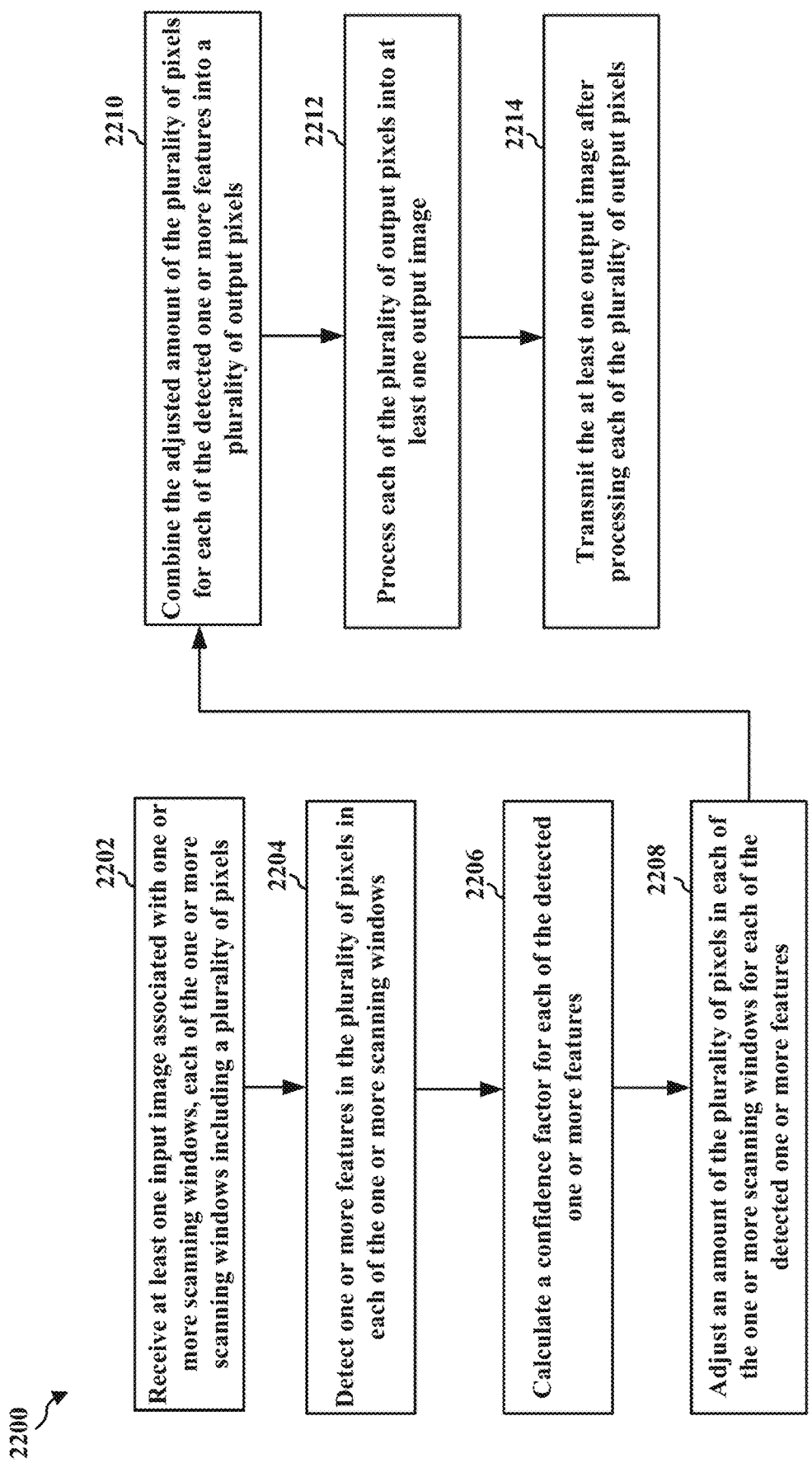
FIG. 22 is a flowchart of an example method of display processing.

FIG. 22 is a flowchart 2200 of an example method of display processing in accordance with one or more techniques of this disclosure. The method may be performed by a DPU, such as an apparatus for display processing, a display processor, a wireless communication device, and/or any apparatus that may perform display processing as used in connection with the examples of FIGS. 1-20.

At 2202, the DPU may receive at least one input image for a scaling operation, the at least one input image being associated with one or more scanning windows, each of the one or more scanning windows including a plurality of pixels, as described in connection with the examples in FIGS. 1-20. For example, as described in 2010 of FIG. 20, DPU 2002 may receive at least one input image for a scaling operation, the at least one input image being associated with one or more scanning windows, each of the one or more scanning windows including a plurality of pixels. Further, step 2202 may be performed by display processor 127 in FIG. 1. In some aspects, the one or more scanning windows may be one or more pixel grids.

At 2204, the DPU may detect one or more features in the plurality of pixels in each of the one or more scanning windows, as described in connection with the examples in FIGS. 1-20. For example, as described in 2020 of FIG. 20, DPU 2002 may detect one or more features in the plurality of pixels in each of the one or more scanning windows. Further, step 2204 may be performed by display processor 127 in FIG. 1. The one or more features in the plurality of pixels in each of the one or more scanning windows may include at least one of one or more corners or one or more edges. The one or more corners may include one or more category 1 corners and one or more category 2 corners, where the one or more category 1 corners may be associated with a non-rotated horizontal axis and a non-rotated vertical axis and the one or more category 2 corners may be associated with a 45-degree rotated horizontal axis and a 45-degree rotated vertical axis.

At 2206, the DPU may calculate a confidence factor for each of the detected one or more features in the plurality of pixels in each of the one or more scanning windows, as described in connection with the examples in FIGS. 1-20. For example, as described in 2030 of FIG. 20, DPU 2002 may calculate a confidence factor for each of the detected one or more features in the plurality of pixels in each of the one or more scanning windows. Further, step 2206 may be performed by display processor 127 in FIG. 1. In some instances, the calculation of the confidence factor for each of the one or more features may correspond to a non-maximum suppression process. The confidence factor for each of the one or more features may correspond to a confidence in an accuracy of each of the one or more features, where the confidence factor may be a value between 0 and 1. Also, the combination of the adjusted amount of the plurality of pixels may be based on the confidence factor for each of the one or more features. Further, the one or more features may include one or more corners and one or more edges, where the confidence factor may be an edge strength metric for each of the one or more edges and a corner strength metric for each of the one or more corners.

At 2208, the DPU may adjust an amount of the plurality of pixels in each of the one or more scanning windows for each of the detected one or more features, as described in connection with the examples in FIGS. 1-20. For example, as described in 2040 of FIG. 20, DPU 2002 may adjust an amount of the plurality of pixels in each of the one or more scanning windows for each of the detected one or more features. Further, step 2208 may be performed by display processor 127 in FIG. 1. In some aspects, adjusting the amount of the plurality of pixels in each of the one or more scanning windows may adjust a pixel resolution of the one or more scanning windows. Also, the adjustment of the amount of the plurality of pixels in each of the one or more scanning windows may correspond to corner interpolation or edge interpolation. The edge interpolation may be associated with tri-directional edge filtering and the corner interpolation may be associated with pattern matching-based corner filtering.

At 2210, the DPU may combine the adjusted amount of the plurality of pixels for each of the detected one or more features into a plurality of output pixels, as described in connection with the examples in FIGS. 1-20. For example, as described in 2050 of FIG. 20, DPU 2002 may combine the adjusted amount of the plurality of pixels for each of the detected one or more features into a plurality of output pixels. Further, step 2210 may be performed by display processor 127 in FIG. 1. The combination of the adjusted amount of the plurality of pixels for each of the detected one or more features may be a linear combination.

At 2212, the DPU may process each of the plurality of output pixels into at least one output image, as described in connection with the examples in FIGS. 1-20. For example, as described in 2060 of FIG. 20, DPU 2002 may process each of the plurality of output pixels into at least one output image. Further, step 2212 may be performed by display processor 127 in FIG. 1. In some instances, the DPU may scan each of the plurality of output pixels, where each of the plurality of output pixels may be scanned in a scanning order. For instance, processing each of the plurality of output pixels may include scanning each of the plurality of output pixels, where each of the plurality of output pixels may be scanned in a scanning order. Additionally, each of the plurality of output pixels may be processed at a display processing unit (DPU) or a DPU scaler.

At 2214, the DPU may transmit, to a display or a panel, the at least one output image after processing each of the plurality of output pixels, as described in connection with the examples in FIGS. 1-20. For example, as described in 2070 of FIG. 20, DPU 2002 may transmit, to a display or a panel, the at least one output image after processing each of the plurality of output pixels. Further, step 2214 may be performed by display processor 127 in FIG. 1.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus, e.g., display processor 127, may include means for receiving at least one input image for a scaling operation, the at least one input image being associated with one or more scanning windows, each of the one or more scanning windows including a plurality of pixels; means for detecting one or more features in the plurality of pixels in each of the one or more scanning windows; means for adjusting an amount of the plurality of pixels in each of the one or more scanning windows for each of the detected one or more features; means for combining the adjusted amount of the plurality of pixels for each of the detected one or more features into a plurality of output pixels; means for processing each of the plurality of output pixels into at least one output image; means for calculating a confidence factor for each of the detected one or more features in the plurality of pixels in each of the one or more scanning windows; and means for transmitting, to a display or a panel, the at least one output image after processing each of the plurality of output pixels.

The subject matter described herein may be implemented to realize one or more benefits or advantages. For instance, the described display processing techniques may be used by a DPU, a display processor, or some other processor that may perform display processing to implement the pattern matching and corner/edge filtering techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize pattern matching and corner/edge filtering techniques in order to improve memory bandwidth efficiency and/or increase processing speed at a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing including at least one processor coupled to a memory and configured to: receive at least one input image for a scaling operation, the at least one input image being associated with one or more scanning windows, each of the one or more scanning windows including a plurality of pixels; detect one or more features in the plurality of pixels in each of the one or more scanning windows; adjust an amount of the plurality of pixels in each of the one or more scanning windows for each of the detected one or more features; combine the adjusted amount of the plurality of pixels for each of the detected one or more features into a plurality of output pixels; and process each of the plurality of output pixels into at least one output image.

Aspect 2 is the apparatus of aspect 1, where the at least one processor is further configured to: calculate a confidence factor for each of the detected one or more features in the plurality of pixels in each of the one or more scanning windows.

Aspect 3 is the apparatus of any of aspects 1 and 2, where the calculation of the confidence factor for each of the one or more features corresponds to a non-maximum suppression process.

Aspect 4 is the apparatus of any of aspects 1 to 3, where the confidence factor for each of the one or more features corresponds to a confidence in an accuracy of each of the one or more features, where the confidence factor is a value between 0 and 1.

Aspect 5 is the apparatus of any of aspects 1 to 4, where the combination of the adjusted amount of the plurality of pixels is based on the confidence factor for each of the one or more features.

Aspect 6 is the apparatus of any of aspects 1 to 5, where the one or more features include one or more corners and one or more edges, where the confidence factor is an edge strength metric for each of the one or more edges and a corner strength metric for each of the one or more corners.

Aspect 7 is the apparatus of any of aspects 1 to 6, where adjusting the amount of the plurality of pixels in each of the one or more scanning windows adjusts a pixel resolution of the one or more scanning windows.

Aspect 8 is the apparatus of any of aspects 1 to 7, where the adjustment of the amount of the plurality of pixels in each of the one or more scanning windows corresponds to corner interpolation or edge interpolation.

Aspect 9 is the apparatus of any of aspects 1 to 8, where the edge interpolation is associated with tri-directional edge filtering and the corner interpolation is associated with pattern matching-based corner filtering.

Aspect 10 is the apparatus of any of aspects 1 to 9, where the one or more features in the plurality of pixels in each of the one or more scanning windows include at least one of one or more corners or one or more edges.

Aspect 11 is the apparatus of any of aspects 1 to 10, where the one or more corners include one or more category 1 corners and one or more category 2 corners, where the one or more category 1 corners are associated with a non-rotated horizontal axis and a non-rotated vertical axis and the one or more category 2 corners are associated with a 45-degree rotated horizontal axis and a 45-degree rotated vertical axis.

Aspect 12 is the apparatus of any of aspects 1 to 11, where the combination of the adjusted amount of the plurality of pixels for each of the detected one or more features is a linear combination.

Aspect 13 is the apparatus of any of aspects 1 to 12, where to process each of the plurality of output pixels, the at least one processor is configured to scan each of the plurality of output pixels, where each of the plurality of output pixels is scanned in a scanning order.

Aspect 14 is the apparatus of any of aspects 1 to 13, where the at least one processor is further configured to: transmit, to a display or a panel, the at least one output image after processing each of the plurality of output pixels.

Aspect 15 is the apparatus of any of aspects 1 to 14, where the one or more scanning windows are one or more pixel grids.

Aspect 16 is the apparatus of any of aspects 1 to 15, where each of the plurality of output pixels is processed at a display processing unit (DPU) or a DPU scaler.

Aspect 17 is the apparatus of any of aspects 1 to 16, further including at least one of an antenna or a transceiver coupled to the at least one processor.

Aspect 18 is a method of display processing for implementing any of aspects 1 to 17.

Aspect 19 is an apparatus for display processing including means for implementing any of aspects 1 to 17.

Aspect 20 is a computer-readable medium storing computer executable code, the code when executed by at least one processor causes the at least one processor to implement any of aspects 1 to 17.

What is claimed is:

1. An apparatus for display processing, comprising:
   a memory; and
   at least one processor coupled to the memory and configured to:
      receive at least one input image for a scaling operation, the at least one input image being associated with one or more scanning windows, each of the one or more scanning windows including a plurality of pixels;
      detect one or more features in the plurality of pixels in each of the one or more scanning windows;
      adjust an amount of the plurality of pixels in each of the one or more scanning windows for each of the detected one or more features;
      combine the adjusted amount of the plurality of pixels for each of the detected one or more features into a plurality of output pixels; and
      process each of the plurality of output pixels into at least one output image.

2. The apparatus of claim 1, wherein the at least one processor is further configured to:
   calculate a confidence factor for each of the detected one or more features in the plurality of pixels in each of the one or more scanning windows.

3. The apparatus of claim 2, wherein the calculation of the confidence factor for each of the one or more features corresponds to a non-maximum suppression process.

4. The apparatus of claim 2, wherein the confidence factor for each of the one or more features corresponds to a confidence in an accuracy of each of the one or more features, wherein the confidence factor is a value between 0 and 1.

5. The apparatus of claim 2, wherein the combination of the adjusted amount of the plurality of pixels is based on the confidence factor for each of the one or more features.

6. The apparatus of claim 2, wherein the one or more features include one or more corners and one or more edges, wherein the confidence factor is an edge strength metric for each of the one or more edges and a corner strength metric for each of the one or more corners.

7. The apparatus of claim 1, wherein adjusting the amount of the plurality of pixels in each of the one or more scanning windows adjusts a pixel resolution of the one or more scanning windows.

8. The apparatus of claim 1, wherein the adjustment of the amount of the plurality of pixels in each of the one or more scanning windows corresponds to corner interpolation or edge interpolation.

9. The apparatus of claim 8, wherein the edge interpolation is associated with tri-directional edge filtering and the corner interpolation is associated with pattern matching-based corner filtering.

10. The apparatus of claim 1, wherein the one or more features in the plurality of pixels in each of the one or more scanning windows include at least one of one or more corners or one or more edges.

11. The apparatus of claim 10, wherein the one or more corners include one or more category 1 corners and one or more category 2 corners, wherein the one or more category 1 corners are associated with a non-rotated horizontal axis and a non-rotated vertical axis and the one or more category 2 corners are associated with a 45-degree rotated horizontal axis and a 45-degree rotated vertical axis.

12. The apparatus of claim 1, wherein the combination of the adjusted amount of the plurality of pixels for each of the detected one or more features is a linear combination.

13. The apparatus of claim 1, wherein to process each of the plurality of output pixels, the at least one processor is configured to scan each of the plurality of output pixels, wherein each of the plurality of output pixels is scanned in a scanning order.

14. The apparatus of claim 1, wherein the at least one processor is further configured to:
   transmit, to a display or a panel, the at least one output image after processing each of the plurality of output pixels.

15. The apparatus of claim 1, wherein the one or more scanning windows are one or more pixel grids.

16. The apparatus of claim 1, further comprising at least one of an antenna or a transceiver coupled to the at least one processor, wherein each of the plurality of output pixels is processed at a display processing unit (DPU) or a DPU scaler.

17. A method of display processing, comprising:
   receiving at least one input image for a scaling operation, the at least one input image being associated with one or more scanning windows, each of the one or more scanning windows including a plurality of pixels;
   detecting one or more features in the plurality of pixels in each of the one or more scanning windows;
   adjusting an amount of the plurality of pixels in each of the one or more scanning windows for each of the detected one or more features;
   combining the adjusted amount of the plurality of pixels for each of the detected one or more features into a plurality of output pixels; and
   processing each of the plurality of output pixels into at least one output image.

18. The method of claim 17, further comprising:

calculating a confidence factor for each of the detected one or more features in the plurality of pixels in each of the one or more scanning windows.

19. The method of claim 18, wherein the calculation of the confidence factor for each of the one or more features corresponds to a non-maximum suppression process.

20. The method of claim 18, wherein the confidence factor for each of the one or more features corresponds to a confidence in an accuracy of each of the one or more features, wherein the confidence factor is a value between 0 and 1.

21. The method of claim 18, wherein the combination of the adjusted amount of the plurality of pixels is based on the confidence factor for each of the one or more features.

22. The method of claim 18, wherein the one or more features include one or more corners and one or more edges, wherein the confidence factor is an edge strength metric for each of the one or more edges and a corner strength metric for each of the one or more corners.

23. The method of claim 17, wherein adjusting the amount of the plurality of pixels in each of the one or more scanning windows adjusts a pixel resolution of the one or more scanning windows.

24. The method of claim 17, wherein the adjustment of the amount of the plurality of pixels in each of the one or more scanning windows corresponds to corner interpolation or edge interpolation, wherein the edge interpolation is associated with tri-directional edge filtering and the corner interpolation is associated with pattern matching-based corner filtering.

25. The method of claim 17, wherein the one or more features in the plurality of pixels in each of the one or more scanning windows include at least one of one or more corners or one or more edges, wherein the one or more corners include one or more category 1 corners and one or more category 2 corners, wherein the one or more category 1 corners are associated with a non-rotated horizontal axis and a non-rotated vertical axis and the one or more category 2 corners are associated with a 45-degree rotated horizontal axis and a 45-degree rotated vertical axis.

26. The method of claim 17, wherein the combination of the adjusted amount of the plurality of pixels for each of the detected one or more features is a linear combination, wherein processing each of the plurality of output pixels comprises scanning each of the plurality of output pixels, wherein each of the plurality of output pixels is scanned in a scanning order.

27. The method of claim 17, further comprising:
transmitting, to a display or a panel, the at least one output image after processing each of the plurality of output pixels.

28. The method of claim 17, wherein the one or more scanning windows are one or more pixel grids, wherein each of the plurality of output pixels is processed at a display processing unit (DPU) or a DPU scaler.

29. An apparatus for display processing, comprising:
means for receiving at least one input image for a scaling operation, the at least one input image being associated with one or more scanning windows, each of the one or more scanning windows including a plurality of pixels;
means for detecting one or more features in the plurality of pixels in each of the one or more scanning windows;
means for adjusting an amount of the plurality of pixels in each of the one or more scanning windows for each of the detected one or more features;
means for combining the adjusted amount of the plurality of pixels for each of the detected one or more features into a plurality of output pixels; and
means for processing each of the plurality of output pixels into at least one output image.

30. A non-transitory computer-readable medium storing computer executable code for display processing, the code when executed by a processor causes the processor to:
receive at least one input image for a scaling operation, the at least one input image being associated with one or more scanning windows, each of the one or more scanning windows including a plurality of pixels;
detect one or more features in the plurality of pixels in each of the one or more scanning windows;
adjust an amount of the plurality of pixels in each of the one or more scanning windows for each of the detected one or more features;
combine the adjusted amount of the plurality of pixels for each of the detected one or more features into a plurality of output pixels; and
process each of the plurality of output pixels into at least one output image.

* * * * *